United States Patent
Amagasa

[19]

[11] Patent Number: 6,157,154
[45] Date of Patent: Dec. 5, 2000

[54] WIPER APPARATUS AND A METHOD FOR CONTROLLING THE WIPER APPARATUS

[75] Inventor: Toshiyuki Amagasa, Ota, Japan

[73] Assignee: Mitsuba Corporation, Gunma, Japan

[21] Appl. No.: 09/290,219

[22] Filed: Apr. 13, 1999

[30] Foreign Application Priority Data

| Apr. 22, 1998 | [JP] | Japan | 10-111897 |
| Apr. 22, 1998 | [JP] | Japan | 10-111898 |
| Apr. 22, 1998 | [JP] | Japan | 10-111899 |

[51] Int. Cl.[7] ............... B60S 1/08; H02P 5/52
[52] U.S. Cl. ............ 318/443; 318/444; 318/41; 318/DIG. 2
[58] Field of Search ............ 318/440–469, 318/DIG. 2, 41–90; 15/250 R, 250.12, 250.17, 250.29, 250.21, 250.23, 250.35; 364/424.01, 424.06

[56] References Cited

U.S. PATENT DOCUMENTS

| 4,431,954 | 2/1984 | Carpenter et al. | 318/443 |
| 4,665,488 | 5/1987 | Graham et al. | 364/424 |
| 4,698,873 | 10/1987 | Aoki et al. | 15/250.21 |
| 4,900,995 | 2/1990 | Wainwright | 318/443 |
| 4,900,996 | 2/1990 | Wainwright | 318/443 |
| 5,256,950 | 10/1993 | Matsumoto et al. | 318/443 |
| 5,568,026 | 10/1996 | Welch | 318/443 |

*Primary Examiner*—Paul Ip
*Attorney, Agent, or Firm*—McCormick, Paulding & Huber LLP

[57] ABSTRACT

In a wiper apparatus for carrying out wiping motion with use of rotational drive of a motor, reverse rotation due to the application of external force on the wiper blade is positively detected. In response to the detection result, the motion of the motor and the wiper blade is controlled. The detection of the reverse rotation is carried our such that two kinds of periodic signals are generated depending on the rotation direction of the drive shaft, and the phase relationship between the periodic signals are arranged to differ depending on the rotation direction, and then the rotation direction is detected from the phase relationship. The wiper apparatus may be an opposing type wiper apparatus having a pair of wiper blades, and control operation of the wiper blades may be arranged such that the position taken by the wiper blade is detected by counting a number of pulses which are generated in association with the rotation of the drive shaft of the motor. If the wiper apparatus has such arrangement, the pulse count counted during reverse rotation of the drive shaft of the motor is subtracted from the pulse count counted during right rotation of the drive shaft of the motor, whereby the position taken by the wiper blade is accurately determined.

21 Claims, 13 Drawing Sheets

Fig.6

| | | reference for DR-side control | | | | reference for AS-side control | | |
|---|---|---|---|---|---|---|---|---|
| DR | AS | distance | adjustment value (period) | target velocity (period) | AS | DR | distance | adjustment value (period) | target velocity (period) |
| 0 | 0 | 0 | 0 | 4340 | 0 | 0 | 0 | 0 | 4340 |
| 1 | 1 | 0 | -723 | 3617 | 1 | 2 | -1 | 2170 | 6510 |
| 2 | 1 | 1 | -724 | 2893 | 2 | 4 | -2 | 0 | 6510 |
| 3 | 1 | 2 | -723 | 2170 | 3 | 6 | -3 | 0 | 6510 |
| 4 | 2 | 2 | 723 | 2893 | 4 | 8 | -4 | 0 | 6510 |
| 5 | 2 | 3 | 724 | 3617 | 5 | 10 | -5 | 0 | 6510 |
| 6 | 3 | 3 | -241 | 3376 | 6 | 12 | -6 | 0 | 6510 |
| 7 | 3 | 4 | -242 | 3134 | 7 | 14 | -7 | 0 | 6510 |
| 8 | 4 | 4 | 81 | 3215 | 8 | 16 | -8 | 0 | 6510 |
| 9 | 4 | 5 | 80 | 3295 | 9 | 18 | -9 | 0 | 6510 |
| 10 | 5 | 5 | -27 | 3268 | 10 | 20 | -10 | 0 | 6510 |
| 11 | 5 | 6 | -26 | 3242 | 11 | 21 | -10 | -723 | 5787 |
| 12 | 6 | 6 | 9 | 3251 | 12 | 23 | -11 | -724 | 5063 |
| 13 | 6 | 7 | 8 | 3259 | 13 | 24 | -11 | 241 | 5304 |
| 14 | 7 | 7 | -3 | 3256 | 14 | 26 | -12 | 242 | 5546 |
| 15 | 7 | 8 | -2 | 3254 | 15 | 27 | -12 | -81 | 5465 |
| 16 | 8 | 8 | 1 | 3255 | 16 | 29 | -13 | -80 | 5385 |
| 17 | 8 | 9 | 0 | 3255 | 17 | 30 | -13 | 27 | 5412 |
| 18 | 9 | 9 | 181 | 3436 | 18 | 32 | -14 | 26 | 5438 |
| 19 | 9 | 9 | 181 | 3617 | 19 | 33 | -14 | -9 | 5429 |
| 20 | 10 | 10 | 180 | 3797 | 20 | 35 | -15 | -8 | 5421 |
| 21 | 10 | 10 | 361 | 3436 | 21 | 36 | -15 | 3 | 5424 |
| 22 | 11 | 11 | -362 | 3074 | 22 | 38 | -16 | 2 | 5426 |
| 23 | 12 | 11 | 271 | 3345 | 23 | 39 | -16 | -1 | 5425 |
| 24 | 13 | 11 | 272 | 3617 | 24 | 41 | -17 | 0 | 5425 |
| 25 | 13 | 12 | 271 | 3888 | 25 | 42 | -17 | -181 | 5244 |

36d (a)

(b)

(c)

WIPER APPARATUS AND A METHOD FOR CONTROLLING THE WIPER APPARATUS

BACKGROUND OF THE INVENTION

1. Field of the Invention

The present invention relates to a technology for controlling a wiper apparatus for use in a vehicle, and more particularly to a technology advantageously applied to a wiper apparatus having a wiper blade driven by a motor.

2. Related Art Statement

One of the essential requirement for a wiper apparatus is to drive the wiper blade accurately even if unexpected load is applied on the wiper blade.

Incidentally, there has been proposed a circuit configuration for controlling wiper blades in which a relay plate is employed in order that when the wiper switch is turned off during operation the wiper blade automatically stops at a predetermined position. FIG. 14 shows an example of a circuit arrangement applicable to a wiper apparatus. The left and right motors are respectively controlled in its stop operation so that when the wiper switch is turned off the wiper blade is moved to a predetermined angular position and then stopped. Here, the motor 51 is driven by a drive element 53 based on an instruction from the motor drive control unit 52. Turning On/OFF of the motor is executed by a wiper switch 54. Note that when the wiper switch 54 is turned off during operation the wiper blade automatically stops at a predetermined position owing to the function of a relay plate 55.

However, if the left or right wiper blades cause abnormal operation and the drive element 53 is turned off to halt the motor 51 during the drive range of the relay plate 65, there is a problem that the circuit becomes open and easily affected by an external force. That is, when a force is applied to a wiper blade or the like, electro-magnetic braking does not work due to the open state of the circuit. If the external force is greater than the motor static force, the motor cannot withstand the force but is rotated. Therefore, the wiper blade moves and interferes with the other wiper blade if snow, for example, falls on the wiper blade when the wiper blade is stopped to wait.

Incidentally, there are two types of controlling manners in wiper blades. One of them is a parallel type in which a pair of wiper blades are driven while keeping substantially equidistant position between the blades. The other of them is an opposing type in which the pair of wiper blades are controlled to move in an opposing fashion. That is, when one of the blades moves to the center of the front glass the other of the wiper blades also moves to the center of the front glass while one moves away from the center the other is also moves away from the center. In a wiper apparatus of the opposed wiping type, rotation centers of wiper arms are respectively positioned at left and right ends of the front glass and wiper blades move from both sides of the front glass toward the center thereof.

When the left and right wiper blades are driven by respective motors, the mechanism can suffer from asynchronous motions in both of the wiper blades. The asynchronous motion is caused from difference in motor drive characteristics between the left and right motors or the motor rotational rate variations due to lord imposed on the motors.

Moreover, it is general for the wiper apparatus of the opposing type to have an arrangement in which the wiping areas of the left and right wiper blades are normally overlapped at the center portion, or a lower return position of the front glass, so as to enlarge the whole wiping area. If the wiper apparatus is made to have such arrangement, the apparatus is more stringently required to avoid the interference in motion between the pair of blades due to the asynchronous motion of the blades. Accordingly, the motors employed in the apparatus thus arranged are more stringently requested to have equal characteristics and the load variation shall be subjected to more stringent control for eliminating the interference.

In order to avoid the interference in the blade motion in the wiper apparatus set forth above, it is a possible way to control both of the wiper blades independently based on each of the angular position taken by each of the wiper blades. In order to detect the angular position currently taken by the wiper blade, it is a possible way that the driving motor for the wiper blade is coupled to a rotary encoder and the rotary encoder is arranged to generate a number of pulses which is in proportion to the traveling rotation angle of the motor shaft. The number of pulses generated from the rotary encoder is counted and the counted number is regarded as data indicative of the angular position taken by the wiper blade coupled to the motor.

However, the wiper blade employed in the wiper apparatus can also suffer from unexpected external force such as wind, rain, snow or the like, and if such external force is applied to the wiper blade, making the wiper blade move in the undesired direction, the counted number of pulses cannot represent an angular position which is actually taken by the wiper blade. If correspondence between the pulse count and angular position taken by the wiper blade is not assured, it becomes impossible to control the wiper motion accurately.

SUMMARY OF THE INVENTION

Therefore, it is a general object of the invention to propose a method for controlling a wiper apparatus having a wiper blade driven by a motor.

It is another object of the present invention to provide a wiper apparatus in which even if unexpected force is applied to the wiper blade to move the wiper blade in undesired direction, the motion of the wiper blade is positively detected.

It is another object of the present invention to provide a wiper apparatus in which even if unexpected force is applied to the wiper blade, resulting in generation of wrong data indicative of the angular position of the wiper blade, the data can be appropriately corrected.

It is another object of the present invention to provide a wiper apparatus in which even if unexpected force is applied to the wiper blade to move the wiper blade in undesired direction, the motion of the wiper blade is positively detected and the motion resulting from the unexpected force is positively recovered.

It is still another object of the present invention to provide a wiper apparatus in which driving means of the wiper blade can be protected from undesired motion of the wiper blade caused from the unexpected external force.

According to the present invention, there is proposed a method for controlling a wiper apparatus having a wiper blade connected through a drive shaft to a drive motor for driving the wiper blade, comprising the steps of generating a first periodic signal associated with the rotation of the drive shaft and starting at a first phase of rotation, generating a second periodic signal associated with the rotation of the drive shaft and starting at a second phase different from the first phase of rotation, determining the direction of the rotation of the drive shaft based on the relationship between the first phase of the first periodic signal and the second phase of the second periodic signal, and controlling the motor based on the determined direction of the rotation.

According to the above invention, rotation of the drive shaft in the reverse direction can be positively detected and the wiper blade can be controlled based on the detection on the reverse direction.

According to the present invention, there is proposed a method for controlling a wiper apparatus having a couple of wiper blades each connected through a drive shaft to a drive motor driving the wiper blade, the wiper blades being controlled such that the motion of one of the wiper blades relative to the other is maintained in a predetermined state based on a count of pulses which are arranged to be generated in association with the angular distance traveled by each the wiper blades, the method comprising the steps of generating a first periodic signal associated with the rotation of each of the drive shafts and starting at a first phase of rotation, generating a second periodic signal associated with the rotation of each of the drive shafts and starting at a second phase different from the first phase of rotation, determining the direction of the rotation of each of the drive shafts based on the relationship between the first phase of the first periodic signal and the second phase of the second periodic signal, subtracting the pulse count counted during the rotation in one direction from the pulse count counted during the rotation in the other direction, thereby to determine actual angular position of each of the wiper blades, and controlling the wiper blades so as to maintain the positional relationship between the wiper blades in the predetermined state based on the determined actual angular position of each of the wiper blades.

According to the above invention, rotation of the drive shaft in the reverse direction can be positively detected, and control data resulting from the reverse direction can be positively corrected.

According to the present invention, there is proposed a method for controlling a wiper apparatus having a wiper blade connected through a drive shaft to a drive motor for driving the wiper blade, comprising the steps of generating a first periodic signal associated with the rotation of the drive shaft and starting at a first phase of rotation, generating a second periodic signal associated with the rotation of the drive shaft and starting at a second phase different from the first phase of rotation, detecting a predetermined direction of the rotation of the drive shaft based on the relationship between the first phase of the first periodic signal and the second phase of the second periodic signal, and controlling the motor to rotate in the other direction opposite to the predetermined direction in response to the detection of the rotation of the drive shaft in the predetermined direction.

According to the above invention, rotation of the drive shaft in the reverse direction can be positively detected and the motion resulting from the unexpected force is positively recovered.

According to the present invention, there is provided a wiper apparatus having a wiper blade connected through a drive shaft to a drive motor for driving the wiper blade, comprising first signal generating means for generating a first periodic signal associated with the rotation of the drive shaft and starting at a first phase of rotation, second signal generating means for generating a second periodic signal associated with the rotation of the drive shaft and starting at a second phase different from the first phase of rotation, determining means for determining the direction of the rotation of the drive shaft based on the relationship between the first phase of the first periodic signal and the second phase of the second periodic signal, and control means for controlling the motor based on the determined direction of the rotation.

According to the above invention, rotation of the drive shaft in the reverse direction can be positively detected and the wiper blade can be controlled based on the detection on the reverse direction.

According to the present invention, there is provided a wiper apparatus having a couple of wiper blades each connected through a drive shaft to a drive motor driving the wiper blade, the wiper blades being controlled such that the motion of one of the wiper blades relative to the other is maintained in a predetermined state based on a count of pulses which are arranged to be generated in association with the angular distance traveled by each the wiper blades, the wiper apparatus comprising first generating means for generating a first periodic signal associated with the rotation of each of the drive shafts and starting at a first phase of rotation, second generating means for generating a second periodic signal associated with the rotation of each of the drive shafts and starting at a second phase different from the first phase of rotation, determining means for determining the direction of the rotation of each of the drive shafts based on the relationship between the first phase of the first periodic signal and the second phase of the second periodic signal, calculation means for subtracting the pulse count counted during the rotation in one direction from the pulse count counted during the rotation in the other direction, thereby to determine actual angular position of each of the wiper blades, and controlling means for controlling the wiper blades so as to maintain the positional relationship between the wiper blades in the predetermined state based on the determined actual angular position of each of the wiper blades.

According to the above invention, rotation of the drive shaft in the reverse direction can be positively detected, and control data resulting from the reverse direction can be positively corrected.

According to the present invention, there is provided a wiper apparatus having a wiper blade connected through a drive shaft to a drive motor for driving the wiper blade, comprising first signal generating means for generating a first periodic signal associated with the rotation of the drive shaft and starting at a first phase of rotation, second signal generating means for generating a second periodic signal associated with the rotation of the drive shaft and starting at a second phase different from the first phase of rotation, detecting means for detecting a predetermined direction of the rotation of the drive shaft based on the relationship between the first phase of the first periodic signal and the second phase of the second periodic signal, and control means for controlling the motor to rotate in the other direction opposite to the predetermined direction in response to the detection of the rotation of the drive shaft in the predetermined direction.

According to the above invention, rotation of the drive shaft in the reverse direction can be positively detected and the motion resulting from the unexpected force is positively recovered.

In the above-described wiper apparatus, the signal generating means may be comprised of a magnet attached to the drive shaft and a sensor device capable of sensing a magnetic field exerted by the magnet attached to the drive shaft.

According to the present invention, there is provided a wiper apparatus having a wiper blade attached to a wiper arm driven by a motor, comprising a one-way clutch connecting the wiper arm to the motor, whereby the rotational drive in one direction can be transmitted from the motor to the wiper arm but the rotation in the other direction opposite to the one direction is limited to be transmitted from the wiper arm to the motor.

According to the above invention, the motor can be positively protected from being rotated in the reverse direction.

Further objects and advantages of the present invention will be apparent from the following description which is made with reference to the accompanying drawings wherein preferred embodiments of the present invention are clearly shown.

BRIEF DESCRIPTION OF THE DRAWINGS

FIG. 6 is a reference table of which entries are data useful for controlling the wiper blades of the wiper apparatus shown in FIG. 5.

FIG. 10 is a set of diagrams illustrative of the function of the periodic signal generating means in which FIG. 10(a) shows a relationship between a first periodic signal and a second periodic signal when the drive shaft rotates in one direction, FIG. 10(b) shows a relationship between a first periodic signal and a second periodic signal when the drive shaft rotates in the other direction, and FIG. 10(c) is a schematic illustration of an arrangement of a magnet attached to the drive shaft and sensor devices.

DESCRIPTION OF THE PREFERRED EMBODIMENTS

Figure 1:
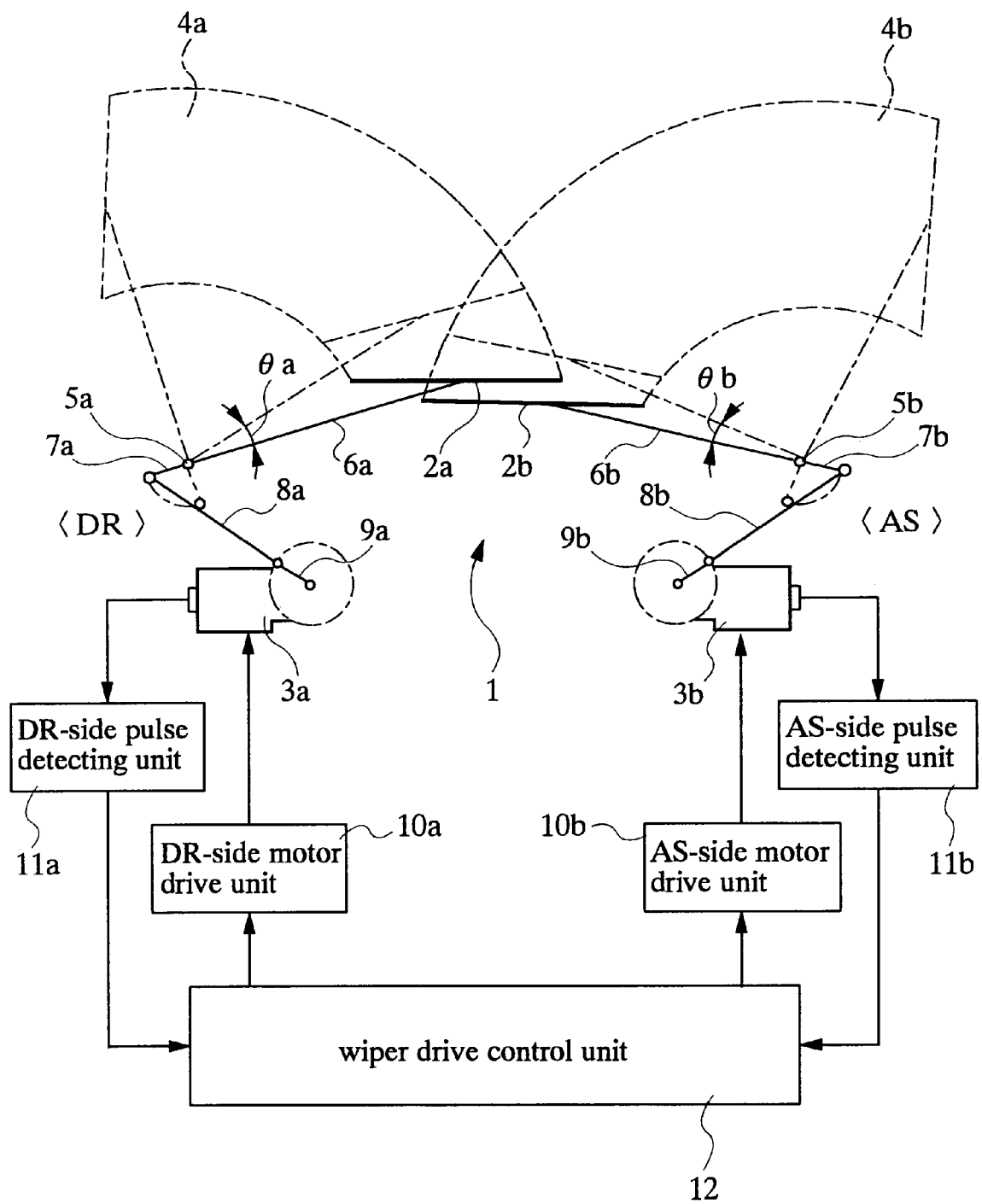
FIG. 1 is a schematic illustration of a construction of a wiper apparatus having a couple of wiper blades to which the present invention can be applied.

Embodiments of the present invention will hereinafter be described in detail with reference to the accompanied drawings. FIG. 1 is a schematic illustration useful for explaining the structure of the opposed wiping type wiper apparatus and the control system thereof.

In FIG. 1, reference numeral 1 depicts a wiper apparatus adaptable to the wiper control method according to the present invention. The wiper apparatus 1 is arranged to wipe a front glass of a vehicle in a so-called opposite fashion in which DR-side wiper blade and AS-side wiper blade are constantly moved in directions opposite to one another. Further, the DR-side wiper blade (as a first wiper blade) 2a and a AS-side wiper blade (as a second wiper blade) 2b (which will be hereinafter referred to as wiper blades 2a and 2b) are driven so that the respective wiping areas overlap each other at their center returning positions. In this wiper apparatus 1, a DR-side motor (as a first motor) 3a and a AS-side motor (as a second motor) 3b (which will be referred to as only motors 3a and 3b) are provided to drive the first wiper blade and the second wiper blade, respectively. Further, they are independently controlled based on the position data (representing angular positions $\theta a$ and $\theta b$) of the wiper blades 2a and 2b. The motor rotation angles, or the angles $\theta a$ and $\theta b$ are measured with respect to the lower return position. It should be noted that "a" and "b" attached to reference numerals of corresponding elements represent that the elements with "a" and "b" relate to the DR-side and the AS-side, respectively.

The wiper blades 2a and 2b are attached with blade rubber members (not shown) so that the blade rubber members assure intimate contact of the wiper blades with the front glass of a vehicle, whereby water drops or the like will be wiped out from wiping areas 4a and 4b depicted with one-dot-chain lines in FIG. 1. The wiper blades 2a and 2b are supported on wiper arms 6a and 6b, and the wiper arms 6a and 6b are driven to pivot about wiper shafts 5a and 5b, respectively, so that a fan-shaped wiping areas are formed. The wiper arm 6a, 6b and a drive lever 7a, 7b are connected to each other by way of the wiper shaft 5a, 5b in an opposing fashion. A connection rod 8a, 8b is attached to one end of the drive lever 7a, 7b. The other end of the connection rod 8a, 8b is connected to one end of a crank arm 9a, 9b which is rotated by the motor 3a, 3b. Further, as the motor 3a, 3b rotates, the crank arm 9a, 9b rotates, making the drive lever 7a, 7b swingably move. Thus, rotation of the motor 3a, 3b is converted into swing motion of the wiper arm 6a, 6b.

The motors 3a and 3b are driven by separate drive circuits, e.g., a DR-side motor drive unit 10a and a AS-side motor drive unit 10b, respectively. In addition, the motor 3a, 3b is connected with a DR-side pulse detector 11a, a AS-side pulse detector 11b, which serves as pulse detection means using a rotary encoder, so that the rotation angles of the wiper arm can be detected. In this case, the motor drive unit 10a, 10b is controlled by a wiper drive control unit 12 and detection values from each of the pulse detectors 11a and 11b are supplied to the wiper drive control unit 12.

Figure 2:
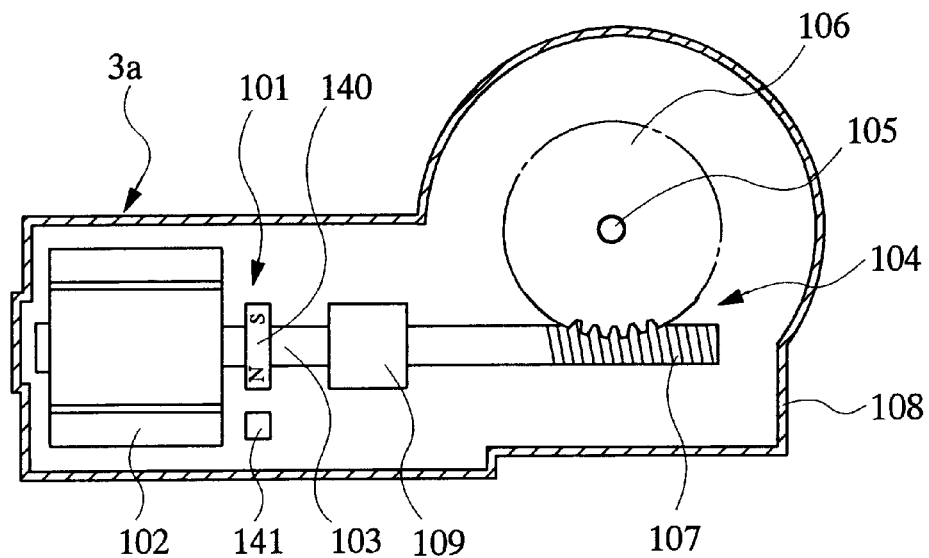
FIG. 2 is a schematic illustration of a rotation transmission mechanism including a drive shaft employed by the wiper apparatus according to the present invention.

In the present embodiment, the motors 3a and 3b are constructed in the structure described below. FIG. 2 is an illustration showing an example of the arrangement of the motors 3a and 3b used in the wiper apparatus 1 according to the present invention. Note that the motors 3a and 3b have an equal structure and the following explanation will be made with reference to the motor 3a as an example.

The motor 3a is constructed in a structure in which an electric motor section 101 and a decelerator section 34 are contained in a housing 108. In this case, the electric motor section is comprised of a stator 102 fixed in the housing 108, an armature shaft 103 rotatably supported in the stator 102, and a known member (not shown) such as a commutator or the like which forms part of the electric motor. The decelerator section 34 is constructed in a structure having a worm 107 connected with the armature shaft 103 through a one-way clutch (mechanism) 39 and a worm wheel 106 attached to an output shaft 105 and engaged with the worm 107. Further, a crank arm 9*a* is attached to an output shaft 105 of a motor output section 104 so that rotation of the motor 3*a* is transmitted to a drive lever 8*a* through the crank arm 9*a* and a connection rod 7*a*.

In this case, only the rotation of the armature shaft 103 in one certain direction which is a predetermined rotation direction preset for the motor 3*a* is transmitted to the worm 107 by the function of the one-way clutch 109. In contrast, when the wiper blades 2*a* or wiper arm 6*a* receives an external force so that the output shaft 105 is applied with a rotation force in a direction opposite to the predetermined rotation direction, the worm wheel 106 and the worm 107 also receive the rotation force in the direction opposite to the predetermined rotation direction. However, in the motor 3*a*, since the one-way clutch 109 is inserted between the armature shaft 103 and the worm 107, such a rotation force is not transmitted to the armature shaft 103.

That is, the rotation in the direction opposite to the predetermined rotation direction inputted through the output shaft 105 from the wiper blade 2*a* coincides with the rotation direction of idle rotation of the one-way clutch 109. The armature shaft 103 is applied with only the idle rotation torque of the one-way clutch 109 which is normally smaller than the static holding force of the motor 3*a*. Therefore, even if a larger rotation force than the static holding force of the motor 3*a* is applied to the worm 107 when the drive circuit is open, the force is let escape from the one-way clutch 109 and the motor 3*a* is not rotated reversely.

The armature shaft 103 is attached with a magnet 140. Further, a pulse detector section 141 comprised of a Hall element or the like is provided in the vicinity of the magnet 140 and serves to detect a rotation pulse indicating the rotation state of the motor by detecting the change of pole of the magnet 140. Note that the pulse detector section 141 in the example of FIG. 2 corresponds to the DR-side pulse detecting unit 11*a* in FIG. 1. Although FIG. 1 shows a structure in which the detecting unit is provided outside the motor 3*a* to clarify the structure of the control system, the detector section is provided inside the housing 108 of the motor 3*a* in FIG. 2.

Figure 3:
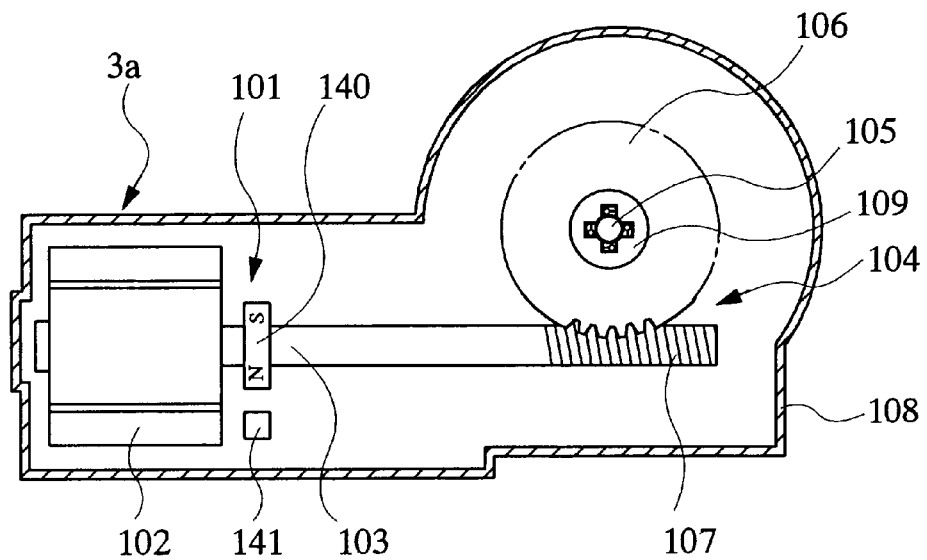
FIG. 3 is a schematic illustration of another rotation transmission mechanism including the drive shaft employed by the wiper apparatus according to the present invention.

FIG. 3 shows a modified example of the motor arrangement shown in FIG. 2 and the one-way clutch 109 is provided at the output shaft 105 in this example. Also, the worm 107 is formed to be integral with the armature shaft 103. In this case, the one-way clutch 109 transmits the rotation force in the regular rotation direction of the motor 3*a* but idly rotates in response to a force in the reverse rotation direction, thereby preventing the rotation in the reverse rotation direction from being transmitted to the armature shaft 103.

Figure 4:
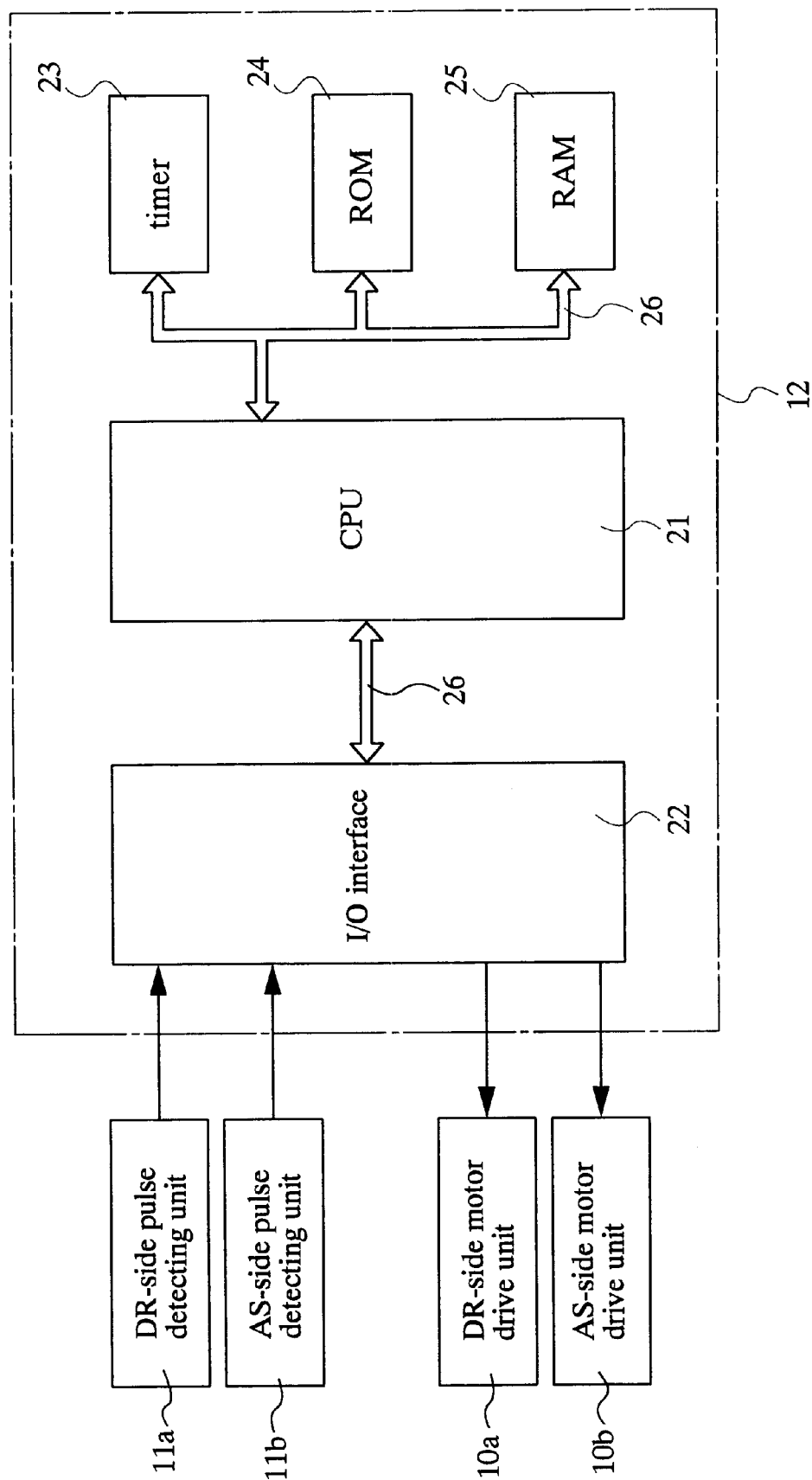
FIG. 4 is a block diagram of a wiper apparatus having a couple of wiper blades to which the present invention can be applied.

FIG. 4 is a block diagram showing the circuit configuration of the wiper drive control unit 12 to which the present invention can be applied. As shown in FIG. 4, the wiper drive control unit 12 is comprised of a microcomputer and peripheral circuits thereof. In the microcomputer, an I/O interface 22, a timer 23, a ROM 24, and a RAM 25 are connected with each other through a bus line 26 extending radially from a CPU 21. Signals from the pulse detectors 11*a* and 11*b* are processed and control signals are supplied to the motor drive unit 10*a* and 10*b*, respectively.

The I/O interface 22 is connected with the DR-side pulse detector 11*a*, AS-side pulse detector 11*b*, DR-side motor drive unit 10*a*, and AS-side motor drive unit 10*b*. Control programs and fixed data for various controls are stored in the ROM 24. RAM 25 stores data of output signals which are subject to data processing useful for supplying to the motor drive units 10*a* and 10*b*, and data calculated by the CPU 21. Further, the CPU 21 executes drive control of the wiper apparatus 1 in accordance with the control programs stored in the ROM 24.

Figure 5:
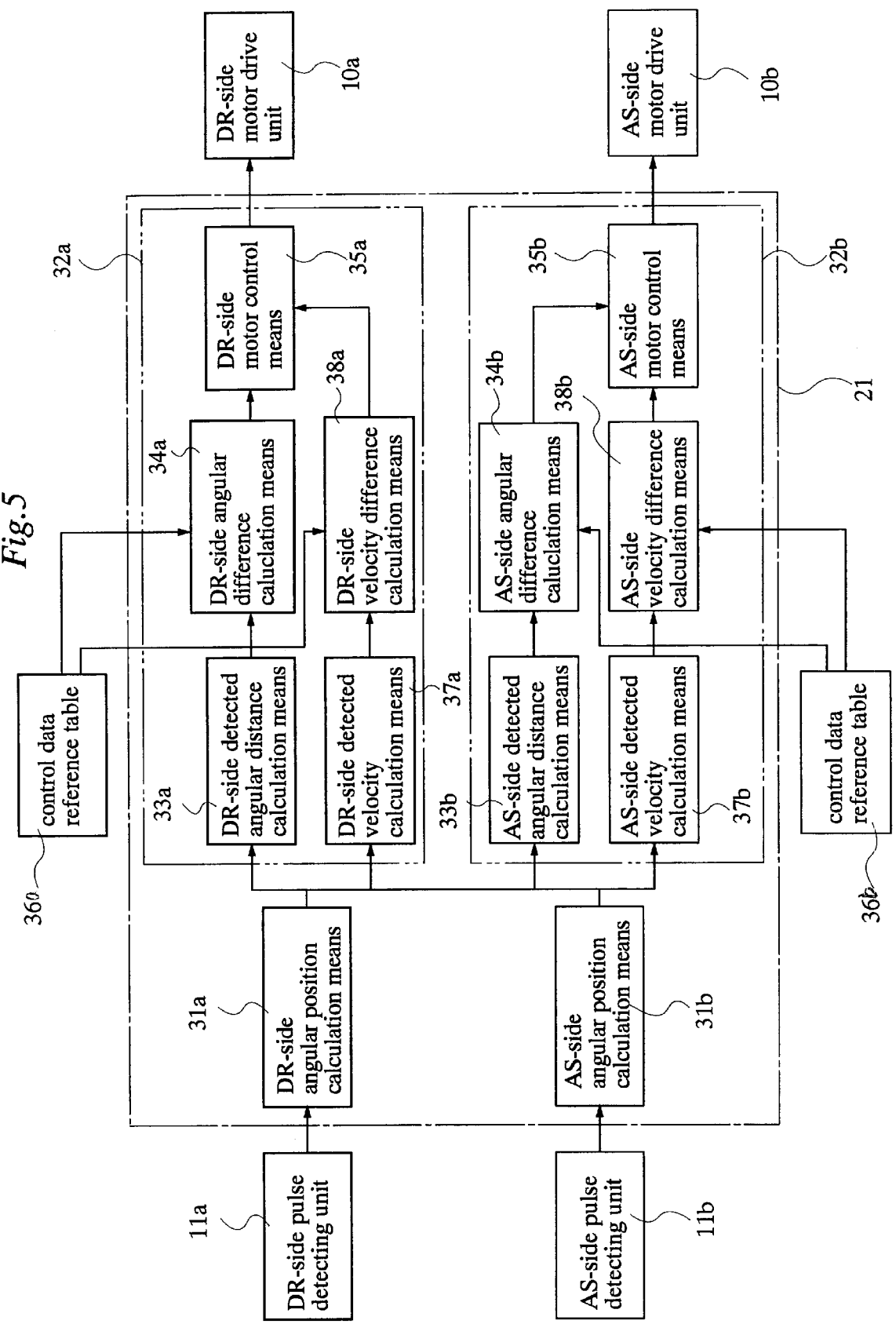
FIG. 5 is a block diagram of a wiper apparatus having a couple of wiper blades to which the present invention can be applied.

FIG. 5 is a block diagram showing an arrangement of the main function of the CPU 21 as to which the present invention can be applied. The method for controlling the wiper apparatus according to the present invention will hereinafter be explained below with reference to FIG. 3 which shows the function of the CPU 21, including the processing steps of the method.

As shown in FIG. 5, the CPU 21 includes a DR-side angular position calculation means (as a first wiper blade angular position calculation means) 31*a* and a AS-side angular position calculation means (as a second wiper blade angular position calculation means) 31*b* for calculating the current angular positions θ*a* and θ*b* of the wiper blades 2*a* and 2*b*, based on pulses supplied from the DR-side pulse detector 11*a* and the AS-side pulse detector 11*b*. The CPU 21 also includes a DR-side motor control means 32*a* and a AS-side motor control means 32*b*. The DR-side motor control means 32*a* and the AS-side motor control means 32*b* calculate control outputs useful for controlling the motors 3*a* and 3*b* based on the angular positions of the wiper blades and supply the outputs to the motor drive units 10*a* and 10*b*.

In this case, the angular position calculation means 31*a* and 31*b* calculate the current angular positions of the wiper blades 2*a* and 2*b* by accumulating the pulses supplied from the pulse detectors 11*a* and 11*b*. Note that the CPU 21 directly deal with the pulse accumulation counts as the angular positions, and the following processing is carried out based on the pulse counts. However, the following processing may be carried out under condition that the relationship between the pulse counts and the angular positions θ*a* and θ*b* (deg) is previously stored in a form of reference table or the like in the ROM 24. In addition, since one revolution (360°) of the motor corresponds to one cyclic motion of the wiper arm, the rotation angles of the motors 3*a* and 3*b* may be obtained from the pulse accumulation counts and may then be dealt with as angular positions x° and the following processing may be then carried out. The following processing may be carried out based on these angular positions.

Also, in the CPU 21, the motor control means 32*a* and 32*b* include a DR-side detected angular position calculation means 33*a* (as a first wiper blade detected angular distance calculation means) and a AS-side detected angular distance calculation means 33*b* (as a second wiper blade detected angular distance calculation means), respectively. The DR-side detected angular position calculation means 33*a* (as a first wiper blade detected angular position calculation means) is utilized for calculating an actual angular position distances between the wiper blades 2*a* and 2*b* observed from the situation of each of the DR-side and AS-side, based on the current angular positions of the wiper blades 2*a* and 2*b*, correcting the values upon necessity, and calculating the DR-side detected angular difference. The AS-side detected angular distance calculation means 33*b* (as a second wiper blade detected angular distance calculation means) also is utilized for calculating the AS-side detected angular distance, in a similar manner.

In this case, the detected angular distance of the DR-side is defined as an angular distance measured from the DR-side relative to the AS-side, while the detected angular distance of the AS-side is defined as a detected angular distance measured from the AS-side relative to the DR-side. For example, if the DR-side wiper blade is position at the angular position of "10" pulses (equivalent to 20° in rotation angle degree of the motor 3a) while the AS-side wiper blade 2b is positioned at the angular position of "3" pulses, the DR-side detected angular distance (or the first wiper blade detected angular distance) is "+7" by subtracting the angular position in the AS-side from the angular position in the DR-side (10–3). On the other hand, as viewed from the AS-side, the AS-side detected angular distance (or the second wiper blade detected angular distance) in this situation is "−7" by subtracting the AS-side detected angular distance (or the second wiper blade detected angular distance) from the angular position of the AS-side wiper blade 2b as a reference.

Next, in the downstream of the detected angular distance calculation means 33a and 33a, respectively, there are provided a DR-side angular difference calculation means 34a (as a first wiper blade angular difference calculation means) and a AS-side angular difference calculation means (as a second wiper blade angular difference calculation means). Each of them calculates angular difference representing the difference between the detected angular distance and the target angular distance at the present time point by comparing the target angular distance as a target value of the angular position distance between both the wiper blades 2a and 2b, with the detected angular distance obtained previously.

The target angular distance utilized for comparison with the detected angular distance is read from each of a DR-side target distance reference table 36a and a AS-side target angular distance reference table 36b which are prepared in the ROM 24. FIGS. 4 and 5 show the structure of these reference tables. FIG. 4 shows the DR-side target angular distance reference table 36a containing target angular distances (or first wiper blade target angular distances) in relation to the angular position in the DR-side as a reference. FIG. 5 shows the DR-side target angular distance reference table 36a containing target angular distances (or second wiper blade target angular distances) in relation to the angular position in the AS-side as a reference.

In this case, for example, it will be found from the DR-side target angular distance reference table 36a in FIG. 4 that when the angular position in the DR-side is "10" pulses and corresponding target angular distance of the AS-side is "5" pulses, which requests that the target angular distance between both sides is "+5". If data of "DR=10, AS=7" is obtained and actual detected angular distance is found to be "+3", as in the above example, the DR-side angular difference calculation means 34a carries out arithmetic operation of ((+5)−(+3)) to determine that the DR-side angular difference (or first wiper blade angular difference) of "+2". This data represents a state that the wiper blade of the AS-side precedes by "2" pulses amount relative to the target angular distance, as viewed from the DR-side wiper blade (i.e., the blade in the AS-side is excessively coming close to the DR-side).

By contrast, as will be understood from the AS-side target angular distance reference table 36b shown in FIG. 5, when the angular position in the AS-side is "7" pulses in the case of the above example (where DR=10, AS=7), the angular position target in the DR-side is "14" pulses and the target angular distance between both sides is "−7". In this respect, since the detected angular distance is "−3" (7–10) in the above example, the AS-side angular difference calculation means 34b calculates AS-side angular difference (second wiper blade angular difference) of "−4" ((−7)−(−3)) with respect to the target angular distance. This data represents that the wiper blade in the DR-side is delayed by "4" pulses relative to the target angular distance, viewed from the following wiper blade in the AS-side (i.e., the blade in the DR-side is coming close to the other).

Meanwhile, in each of the target angular distance reference tables 36, the data distribution of pulses concerning the follower side is rougher then the leading side. This is because control for the follower side blade must be much finer than for the leading wiper blade in order to control the wiper blades such that the following wiper blade might not collide with the leading one. In this time, pulse division for the leading side may be coarse. To see the pulse division in the reference tables, for example, the target angular distance in the AS-side is 1 pulse while the target angular distance in the DR-side ranges from 1 to 3 pulses in FIG. 6. The target angular distance in the AS-side is set to shift like steps. In other words, the wiper blade in the DR-side moves by 3 pulses while the following AS-side moves one pulse, and the data for the DR-side is arranged to be coarse accordingly. In FIG. 6, the target value is set such that the blade in the DR-side moves forward by two pulses while the blade in the AS-side moves by 2 pulses at the initial motion. This means that the DR-side wiper blade moves by two pulses in response to the motion of the following AS-side wiper blade by 1 pulse, and thus, the data for the leading DR-side is coarse as described above.

Therefore, in some cases, there is difference in the control configurations between both sides even if the angular positions in the DR-side and the AS-side are identical to each other. For example, when angular position data of "DR=3, AS=1" is obtained, the DR-side detected angular distance "2" (3−1) is equal to the target angular distance "2" according to FIG. 4, and therefore, the data is taken as OK. However, referring to FIG. 5, the target angular distance is "−1" with respect to "AS=1", and the detected angular distance of "−2" (1−3) is therefore NG in this case. Consequently, normal control is carried out in the DR-side while the following control is carried out in the DR-side to recover a delay.

In the wiper apparatus 1, the leading side and the follower side are exchanged at an upper return position as the boundary. That is, in the returning way, the AS-side leads the DR-side. Accordingly, in the target angular distance reference tables 36a and 36b, the wiper blade in the AS-side leads after pulses 124 beyond pulses 90 although not shown in the figures. Note that the reference table shown in FIG. 6 is merely an example and the formats and values of the reference tables are naturally not limited thereto.

Thus, in the wiper control apparatus according to the present invention, the DR-side and the AS-side are respectively provided with reference tables which include a set of data corresponding to each other, and each of the wiper blades 2a and 2b having different moving velocities is controlled so as to take into account the angular positions of its own and that of the other. Therefore, upon input of a pulse to one of the sides from the motor 3a or 3b, control is started for both the motors 3a and 3b.

Figure 8:
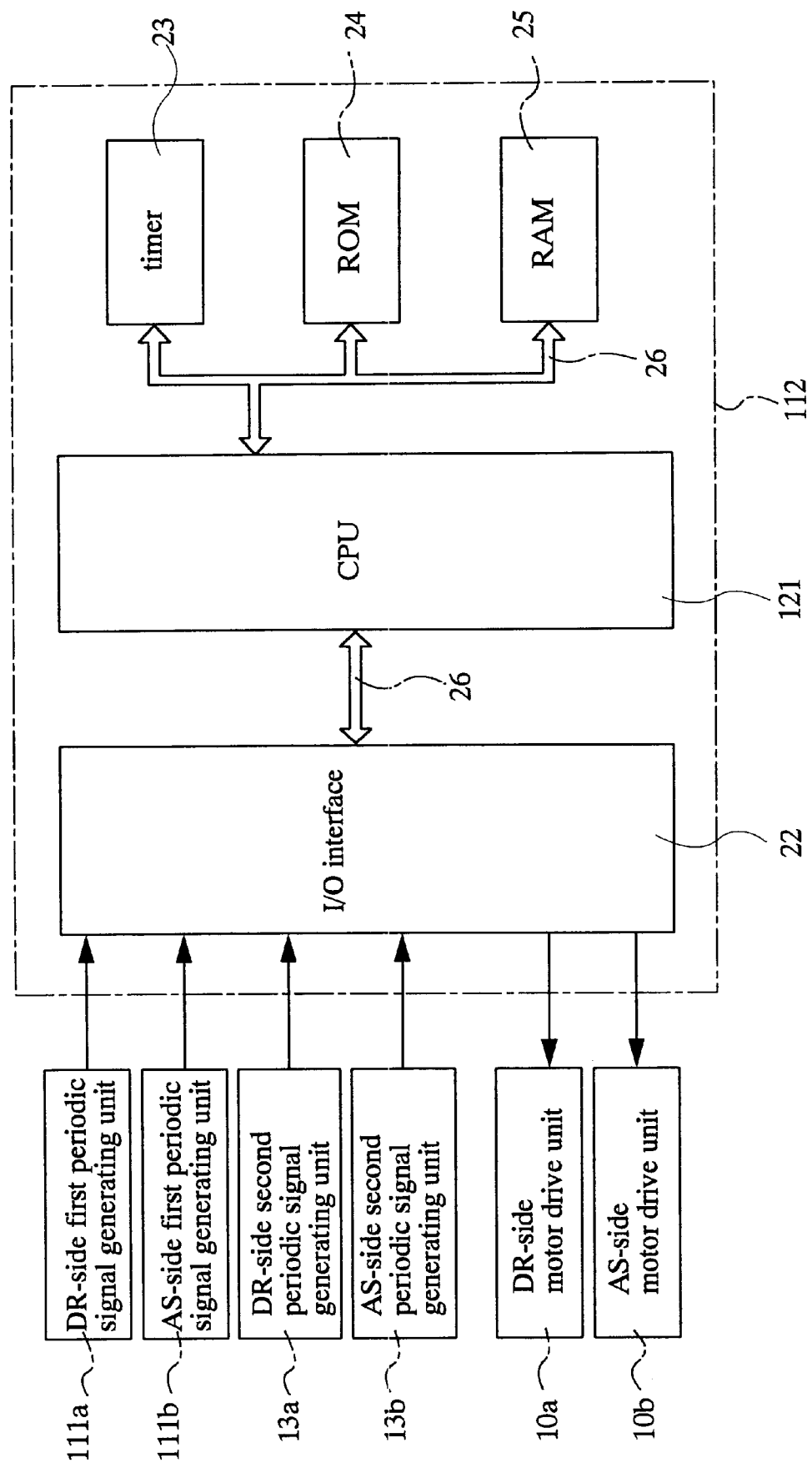
FIG. 8 is a block diagram of a wiper apparatus having a couple of wiper blades to which the present invention is applied.

The CPU 21 carries out wiper control based on data concerning the velocities of the wiper blades 2a and 2b as well as data concerning the angular positions thereof. FIG. 8 is a block diagram showing the configuration of the main function of the CPU 21 as the third embodiment of the present invention. As shown in FIG. 8, the CPU 21 of the third embodiment includes in its the motor control means 32a and 32b, a DR-side wiper blade detected velocity calculation means 37a (or first wiper blade detected velocity calculation means) and a AS-side wiper blade detected velocity calculation means 37b (or second wiper blade detected velocity calculation means), and a DR-side velocity difference calculation means 38a (or first wiper blade detected velocity difference calculation means) and a AS-side velocity difference calculation means 38b (or first wiper blade detected velocity difference calculation means), respectively.

The DR-side and AS-side wiper blade detected velocity calculation means 37a and 37b function to calculate the actual velocities of the wiper blades 2a and 2b at present and obtain the velocities of the wiper blades 2a and 2b by taking the velocities as the times respectively required for the blades to move 1 pulse, i.e., the necessary time per pulse.

The DR-side and AS-side wiper blade detected velocity calculation means 37a and 27b are supplied with the angular positions of the wiper blades 2a and 2b from the angular position calculation means 31a and 31b. Then, the DR-side and AS-side wiper blade detected velocity calculation means 37a and 27b calculate the necessary times per pulse required for the wiper blades 2a and 2b based on the obtained angular positions and the clock count of the timer 23. Thereafter, the DR-side and AS-side wiper blade detected velocity calculation means 37a and 27b supplies these times as the detected velocities of the wiper blades 2a and 2b to the DR-side and AS-side velocity difference calculation means 38a and 38b in the next stage.

Subsequently, the DR-side and AS-side velocity difference calculation means 38a and 38b compare the detected velocities of the wiper blades with the target velocities of the wiper blades which are stored in advance in the control reference table 36c described above. Referring to the control reference table 36c in FIG. 4, for example, if the wiper blade in the DR-side is at "10" pulses, it is found that corresponding DR-side target velocity (or target cycle) is "3268" from the table. The set of target velocities is prepared for each of the DR-side and AS-side, and each of the target velocities is made corespondent to every possible angular position which is determined at every pulse count and thus taken by each of the DR-side and AS-side wiper blades. For example, if the DR-side wiper blade takes an angular position corresponding to "1" pulse amount, the corresponding target velocity for the DR-side wiper blade is "3617" pulse count per unit cycle. When the DR-side wiper blade travels by one pulse amount, or the wiper blade reaches the angular position of "2" pulse amount, the corresponding target velocity for the DR-side wiper blade becomes "2893", which results from addition of "3617" with "–723" in the column of added cycle. This means that the DR-side wiper blade is decelerated when it reaches the angular position of the "2" pulses amount as compared with the angular position of the 1 pulse amount. In this way, the wiper blade is accelerated or decelerated depending on the entries of the column of added cycle at every angular position.

With use of this kind of control reference table 36, the target velocities of the wiper blades 2a and 2b can be finely determined in correspondence with their own angular positions, respectively, so that the target velocity can be changed smoothly for every angle. Accordingly, it is possible to smoothen the output values of the motors which otherwise are generated by merely changing the target angular distances upon necessity in a discrete fashion. In addition, it is possible to realize fine velocity control in which velocities are changed while the angle distance between the DR-side wiper blade and the AS-side wiper blade is maintained constant. Further, if the external force applied on both of the wiper blades are equal and hence change is caused only on velocity but no change on distance between the wiper blades, this change on velocity is detected and feedback control can be effected on the velocity change. Therefore, the period for one cyclic motion for the wiper blades can be maintained constant.

The DR-side angular difference calculation means 38a compares the detected velocity with the corresponding DR-side target velocitiestored in the control data reference table 36c as described above, thereby to obtain the DR-side velocity difference which is indicative of difference between the detected velocity and target velocity. That is, for example, if a value "4000" is obtained as a detected velocity of the wiper blade 2a, the DR-side velocity difference calculation means 38a prepares DR-side velocity difference of "+732" (4000–3268). On the other hand, the AS-side velocity difference calculation means 38b compares the detected velocity of the wiper blade 2b with the AS-side target velocity previously stored in the control data reference table 36c and produces AS-side velocity difference, in a similar manner.

In the rear stage of the angular difference calculation means 34a and 34b and the velocity difference calculation means 38a and 38b, there are provided a DR-side motor control means 35a (as a first motor control means) and a AS-side motor control means 35b (as a second motor control means) for calculating and determining the outputs for the motors 3a and 3b based on the obtained angular difference and the velocity difference data. As described above, the DR-side control means 35a and the AS-side motor control means 35b generate outputs for the motors 3a and 3b so that the difference between the detected angular distance and target angular distance and also the difference between the detected velocities and the target velocities, and supply the outputs to the motor drive units 10a and 10b, respectively. That is, also in the wiper control apparatus according to the present invention, observations are carried out not only on the difference between the detected angular distance and the target angular distance but on difference between detected velocities and the corresponding target velocities, and control is effected on the wiper blades 2a and 2b so that they are brought close to each other.

The DR-side motor control means 35a carries out an arithmetic operation in a manner that a value of "+2" is acquired as the DR-side angular difference data in the example set forth above under consideration of the angular difference information, and then takes into account the velocity difference data to calculate the output for the DR-side motor 3a. In this way, a new output is generated based on the following formula; "new output=a ×(target angular distance–detected angular distance)+×(target velocity–detected velocity)

where a and b are coefficients".

In the case of the above example, as for the angular difference, it is recognized that the AS-side wiper blade is excessively brought close to by two pulses amount with respect to the target angular distance based on the acquired angular difference information. As for the velocity difference, since "+732" is obtained, it is recognized that the velocity of the DR-side wiper blade is higher than the target velocity, and therefore, the output (or rotation velocity) is calculated in consideration of the angular difference described above. Further, a control signal is supplied to the DR-side motor drive unit 10a so as to realize the output.

Also, in the case of the above example, as for the angular difference, a value of −4 is acquired as the AS-side angular difference information, and an output for the AS-side motor 3a is calculated based on the acquired value and the velocity difference information. In this case, it is recognized that the DR-side wiper blade is excessively brought close to by four pulses amount with respect to the target angular distance based on the acquired angular difference information. In accordance with the recognition, an output (rotation rate) lower than the current output is calculated for the AS-side so that the angular position distance is brought close to the target value.

In this way, according to the wiper drive unit 12, when the angular position distance between the wiper blades 2a and 2b becomes smaller than (is brought close to) the target value, then the output for the wiper blade of the leading side is increased while the output for the following side is decreased, whereby the difference between the angular distance and the target distance is made small. Further, when the angular position distance becomes larger than (is brought apart from) the target value, then the output for the wiper blade of the leading side is decreased while the output for the following side is increased, whereby the difference between the angular distance and the target distance is made small. Furthermore, when the velocity of the wiper blade 2a, 2b is lager than each of the target velocity, corresponding output of the motor 3a, 3b is decreased while when the velocity of the wiper blade 2a, 2b is smaller than each of the target velocity, then corresponding output of the motor 3a, 3b is increased, whereby the wiper blades 2a and 2b are controlled to have the target angular distance or target velocity. Thus, the wiper motions becomes smooth and the wiping cycle becomes stable.

Figure 14:
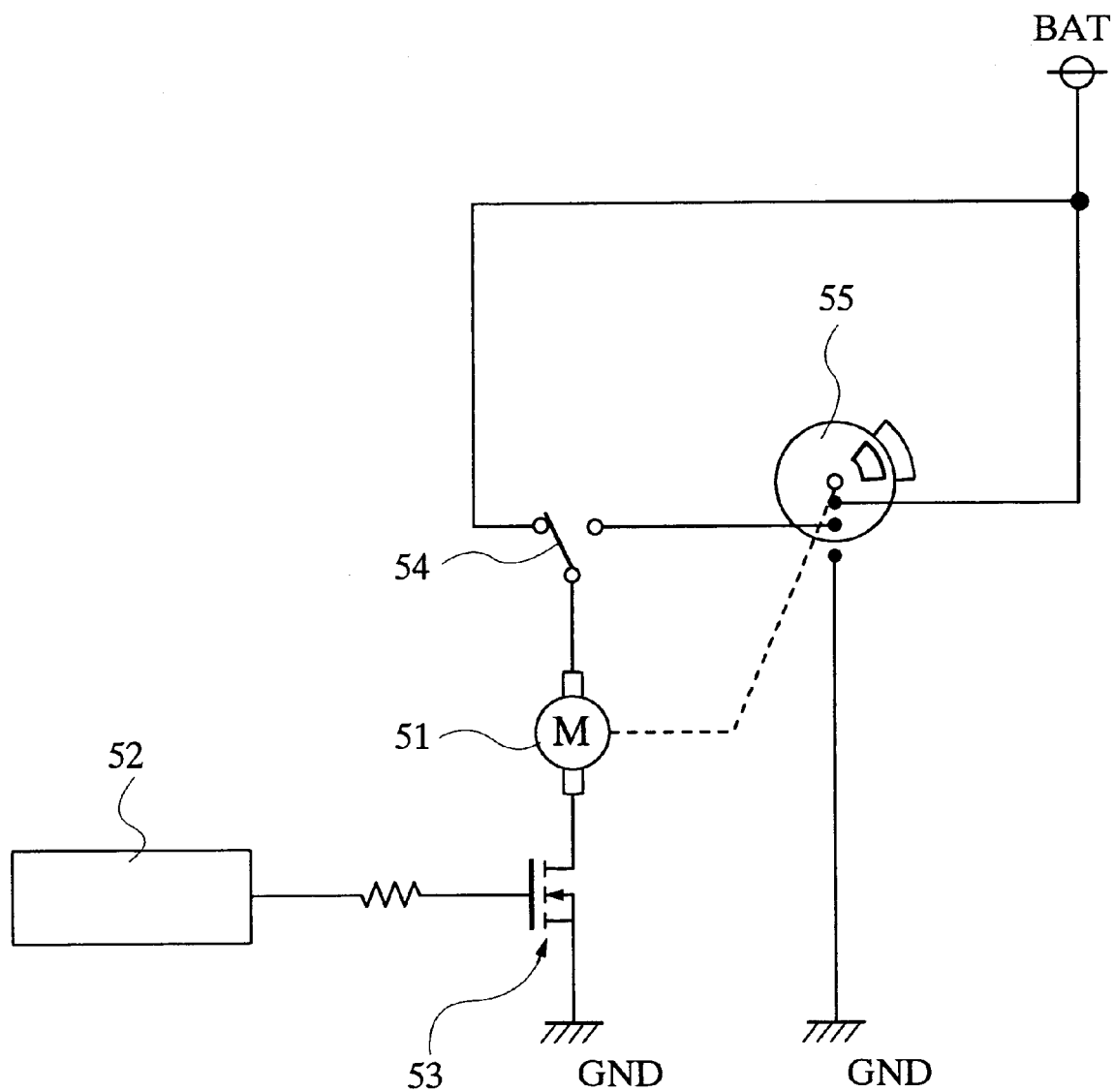
FIG. 14 is a circuit configuration including a wiper switch and a relay plate employed in a wiper apparatus.

Meanwhile, if the DR-side wiper blade is leading with respect to the AS-side wiper blade under the condition that the wiper switch 54 of the circuit in FIG. 14 is turned off in this control procedure, for example, the DR-side wiper blade must be stopped once to let the AS-side wiper blade pass in order to stop the wiper blades 2a and 2b at the lower returning positions. Suppose that such an external force acts on the wiper blade 2a which reversely rotates the motor 3a when the drive element 53 in the DR-side is turned off and the wiper blade 2a is thus stopped once. At this time, in case of a conventional motor 3a, the circuit is opened when the drive element 53 is turned off by the relay plate 55. When the external force exceeds the static holding force of the motor, the motor 3a is rotated reversely thereby moving the wiper blade 2a.

However, in case of the present motor 3a, even if an external force is applied, the one-way clutch 109 rotates idly and let the external force escape thereby preventing the motor 3a from being rotated reversely. Accordingly, the motor 3a is reversely rotated thereby accumulating the rotation pulse, and it is possible to avoid a situation that data concerning the position angle of the wiper blade 2a is changed wrongly. It is also possible to prevent a situation that the wiper blade 2a moves and interferes with the other wiper blade 2b.

Although the one-way clutch 109 is provided at the output shaft 105 or the armature shaft 103 in the example cited above, the layout position of the one-way clutch 109 is not limited to the example. For example, the one-way clutches may e provided at the wiper shafts 5a and 5b as long as the motors 3a and 3b are not rotated reversely by an external force applied to the wiper blades 2a and 2b and the wiper arms 6a and 6b. In addition, the one-way clutch 109 is not limited to a so-called bearing clutch based on rollers or balls but various kinds of clutches such as a ratchet type clutch and a spring clutch are applicable, as long as the one-way clutch 109 is of a type which transmits a rotation force in a rotation direction but rotates idly in response to a rotation force in a reverse rotation direction.

Also, since the one-way clutch mechanism for preventing reverse rotation of the motor is provided between the motor and the wiper arm, for example, at the output shaft or the armature shaft, the wiper arm is prevented from being rotated reversely and from moving directly in accordance with an external force even if an external force acts on the wiper blade or arm when the wiper drive circuit is open. Therefore, if position angle data is changed wrongly due to reverse rotation of the motors, the wiper blades are prevented from causing operation errors and from interfering with each other.

Now, explanation will be made on a method of the present invention in which a pair of periodic signals with different phase are introduced for detecting the reverse rotation of the drive shaft of the motor. In response to the detection, the wiper drive motors may be arranged to be not reversely rotated even if an external force acts during a pause of the wiper apparatus. In the following description, parts corresponding to those of the matter described above will be denoted with the same reference numerals and they will not be explained.

Figure 7:
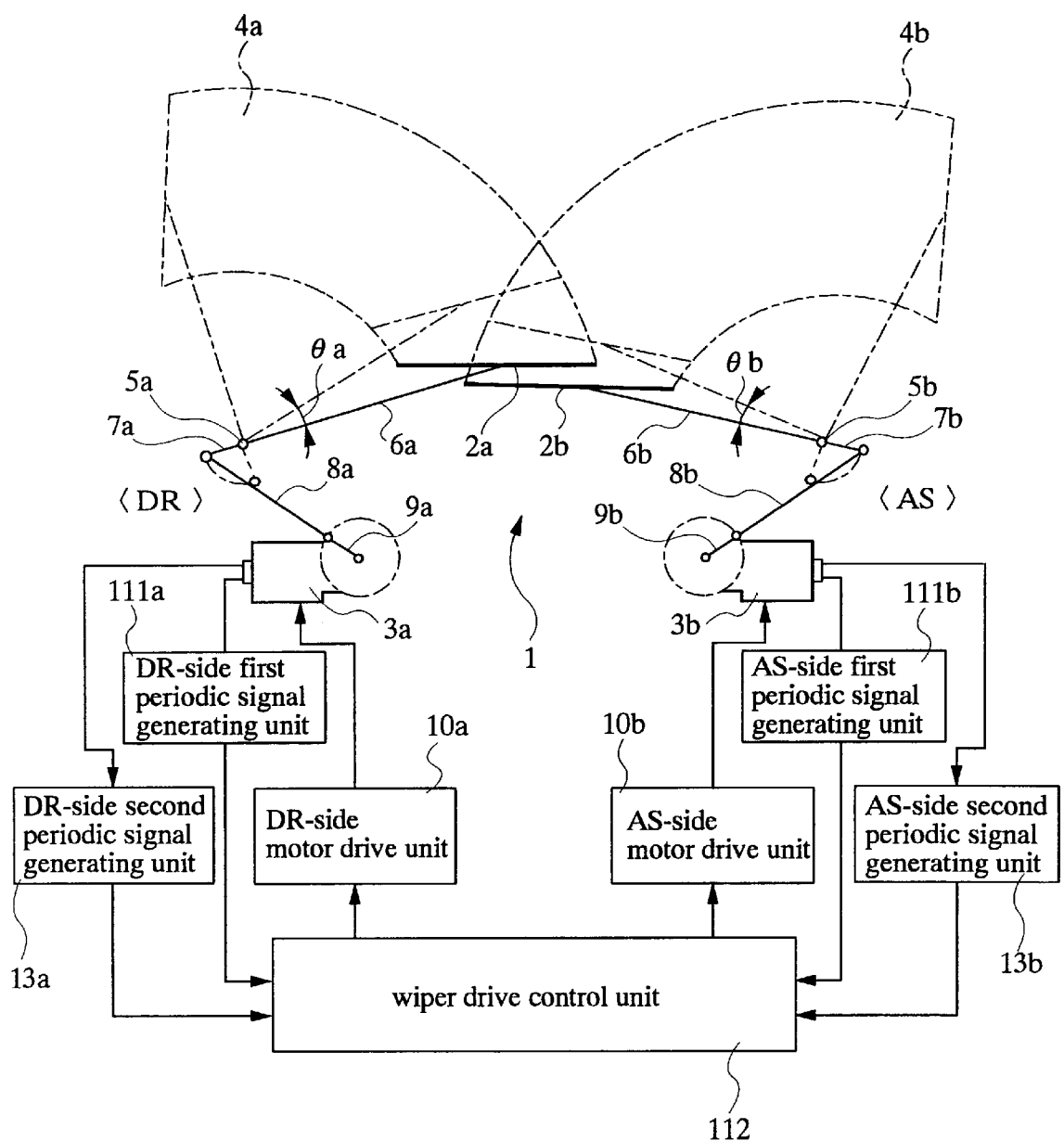
FIG. 7 is a schematic illustration of a construction of a wiper apparatus having a couple of wiper blades to which the present invention is applied.

FIG. 7 is a diagram schematically showing the structure of an opposed wiping type wiper apparatus and a control system thereof as an embodiment of the present invention. Here, the motors 3a and 3b are respectively connected with a DR-side pulse generating unit 111a and a AS-side rotation pulse generating unit 111b each of which uses a Hall element and the like. Rotation angles of the motors 3a and 3b can be detected by rotation pulses generated from the devices therefrom. Further, the motors 3a and 3b are respectively connected with a DR-side direction pulse generating unit 13a and a AS-side direction pulse generating unit 13b each of which is constructed by a pulse generator means as described above and generates a pulse having a phases shifted by 90° from the rotation pulse. The rotation directions of the motors 3a and 3b can be detected by monitoring the direction pulses. Note that the pulse signals from the pulse generating units 111a, 111b, 13a, and 13b are also sent to the wiper drive control apparatus 112.

In addition, FIG. 8 is a block diagram showing the circuit configuration of the wiper drive control apparatus 112 as a second embodiment of the present invention. The I/O interface 22 is connected with the DR-side pulse generating units 111a, AS-side pulse generating unit 111b, DR-side direction pulse generating unit 13a, AS-side pulse generating unit 13b, DR-side motor drive unit 10a, and AS-side motor drive unit 10b.

Figure 9:
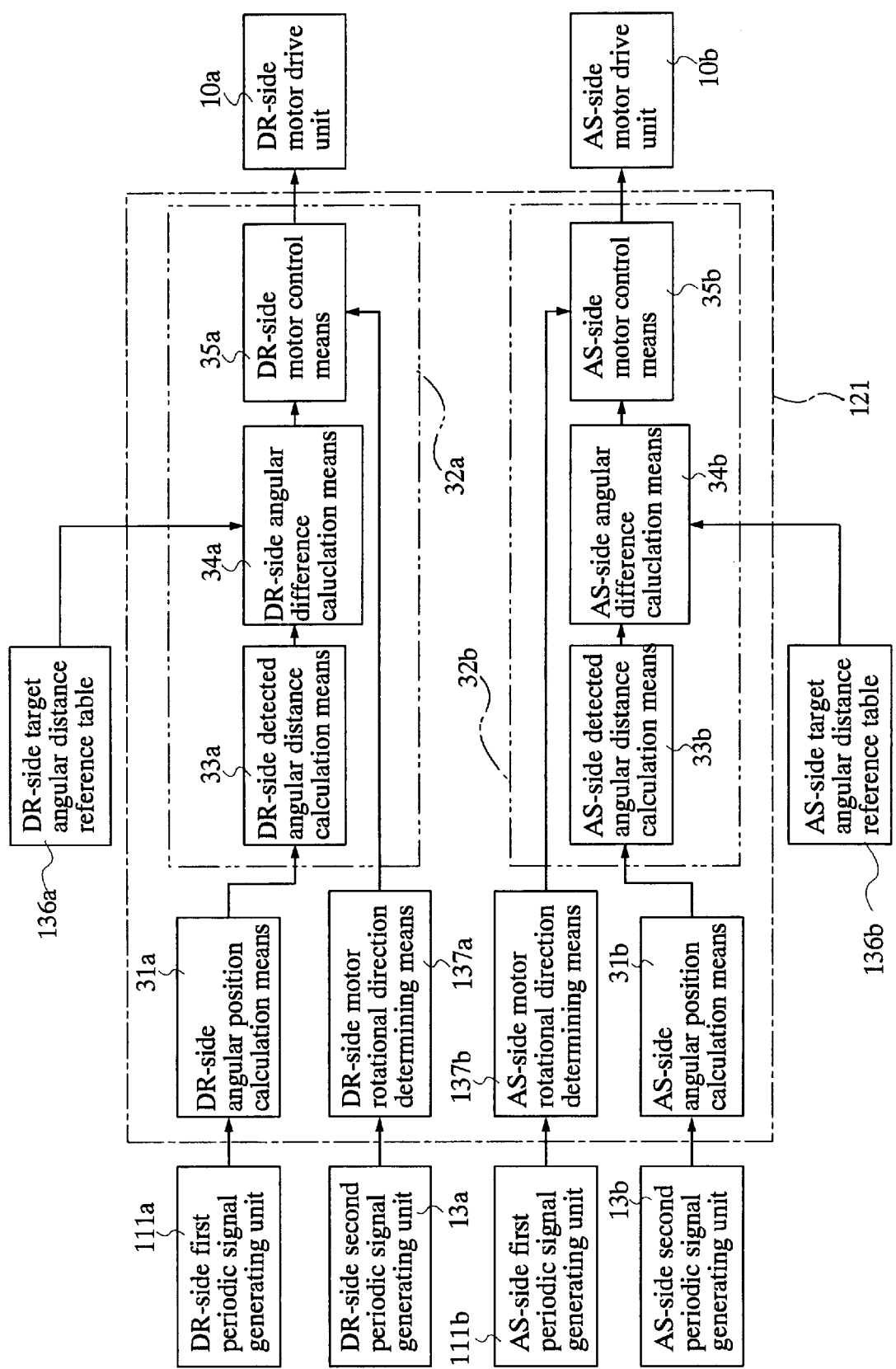
FIG. 9 is a block diagram of a wiper apparatus having a couple of wiper blades to which the present invention is applied.

Further, FIG. 9 is a block diagram showing the structure of the main function of the CPU 121 in the present embodiment. As shown in FIG. 9, the CPU 121 is constructed in a structure including a DR-side position angles calculation means 31a and a AS-side position angle calculation means 31b, a DR-side motor rotation direction detector means 137a and a AS-side motor rotation direction detector means 137b, as well as a DR-side motor control means 32a and a AS-side motor control means 32b. The DR-side position angle calculation means 31a and the AS-side position angle calculation means 31b calculate respectively the current position angles θa and θb, based on the pulses obtained from the pulse generating units 111a, 111b, 13a, and 13b through the I/O interface 22. The DR-side motor rotation direction detector means 137a and AS-side motor rotation direction detector means 137b respectively detect the current rotation directions of the motors 3a and 3b. The DR-side motor control means and AS-side motor control means 32b respectively calculate control outputs with respect to the motors 3a and 3b, based on the position angles and rotation directions thus calculated, and supply the outputs to the motor drive units 10a and 10b.

Figure 10:
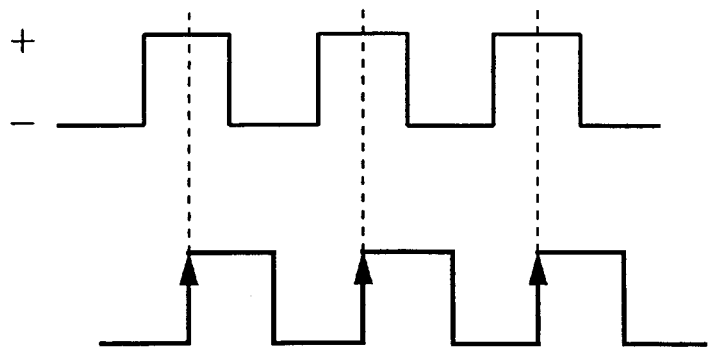
Figure 10:
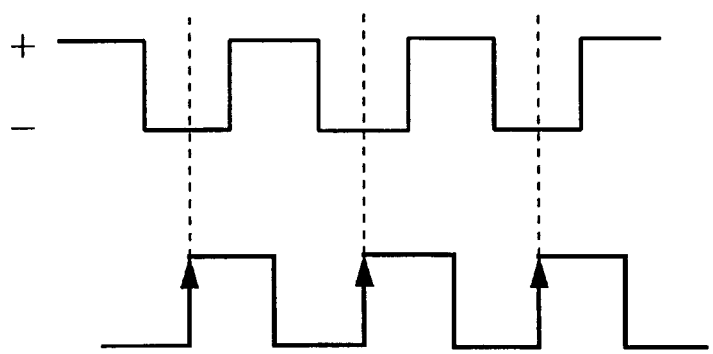
Figure 10:
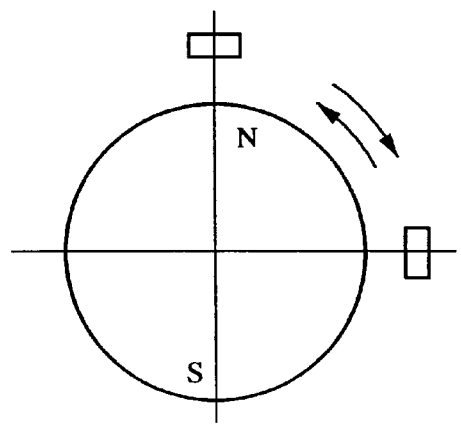

The motor rotation direction detector means 137a and 137b detect respectively the current rotations of the motors 3a and 3b from the rotation pulses and direction pulses obtained from the rotation pulse generating units 111a and 111b and the direction pulses generator devices 13a and 13b. The rotation pulse and the direction pulse have the following relationship between each other. FIGS. 10 are timing charts showing the relationship between both pulses, wherein FIG. 10(*a*) shows a state of regular rotation, FIG. 10(*b*) shows a state of reverse rotation and FIG. 10 (*c*) is a diagram showing the arrangement of the magnet and sensor devices.

In this case, the rotation pulse and the direction pulse are generated by capturing the polar change of a magnet rotating together with each of the motors 3a and 3b, respectively, by means of Hall elements (or magnetism detector elements) A and B which are situated at positions shifted by 90° in terms of the rotation angle of the motors 3a and 3b, as for example shown in FIG. 10 (*c*). Further, when the rotation pulse at the Hall element A rises during regular rotation of the motors 3a and 3b as shown in FIG. 10(*a*), the direction pulse having a phase shifted by 90° at the Hall element B becomes positive. Meanwhile, when the rotation pulse rises during reverse rotation of the motors 3a and 3b as shown in FIG. 10(*b*), the direction pulse becomes negative. Accordingly, each of the motor rotation direction detector means 137a and 137b are capable of detecting the rotation directions of the motors 3a and 3b by determining the codes of the direction pulses at rising timings of the rotation pulses.

Next, the position angle calculation means 31a and 31b respectively calculate the current position angles of the wiper blades 2a and 2b from the rotation pulses obtained by the rotation pulse generating units 111a and 111b and from the direction pulses obtained by the direction pulse generating units 13a and 13b.

When the motors 3a and 3b rotates regularly, the position angle calculation means 31a and 31b respectively accumulate the pulses obtained from the rotation pulse generating units 111a and 111b to calculate the current position angles of the wiper blades 2a and 2b (which may otherwise be the position angles of the wiper arms 6a and 6b). In contrast, when the motors 3a and 3b are rotated reversely, differences appear between the actual position angles of the wiper blades 2a and 2b and the position angles indicated by the rotation pulses if the rotation pulses are simply accumulated. Therefore, if reverse rotation of the motors 3a and 3b is detected, those rotation pulses that are obtained after the detection of the reverse rotation are recognized as pulses depending on reverse rotation motion and are subtracted from the accumulated rotation pulses to correct the position angles, by means of the position angle calculation means 31a and 31b.

For example, suppose that the code of the direction pulse is inverted to "−" when the rotation pulse in the DR-side becomes of "10" pulses (equivalent to 20° in terms of the rotation angle of the motor 3a), and a rotation pulse input of "3" pulses is obtained. In ordinary cases, the "3" pulses inputted later are directly accumulated and data of "13" is obtained as the position angle. However, the position angle calculation means 31a determines that the later "3" pulses belong to reverse rotation and prepares data of "7" (10-3) as the position angle, taking into consideration the inversion of the code of the direction pulse. Therefore, by making this control, even if an external force acts on the wiper blades 2a and 2b and the motors 3a and 3b are rotated reversely, the position angles of the wiper blades 2a and 2b are prevented from being recognized wrongly and operation errors are prevented.

In the present CPU 121, the motor control means 32a and 32b comprise respectively the following functional means, like in the CPU 21 described before. Firstly, the motor control means 32a and 32b respectively comprise a DR-side measurement angle difference calculation means 33a and a AS-side measurement angle difference calculation means 33b, as described before. Note that the "detected angular distance" observed from the viewpoint of the DR-side and the AS-side are the same as those described before. However, if the motors 3a and 3b are rotated reversely as described before, of course, data obtained by correcting pulses belonging to reverse rotation is used to calculate the measurement angle differences.

Figure 11:
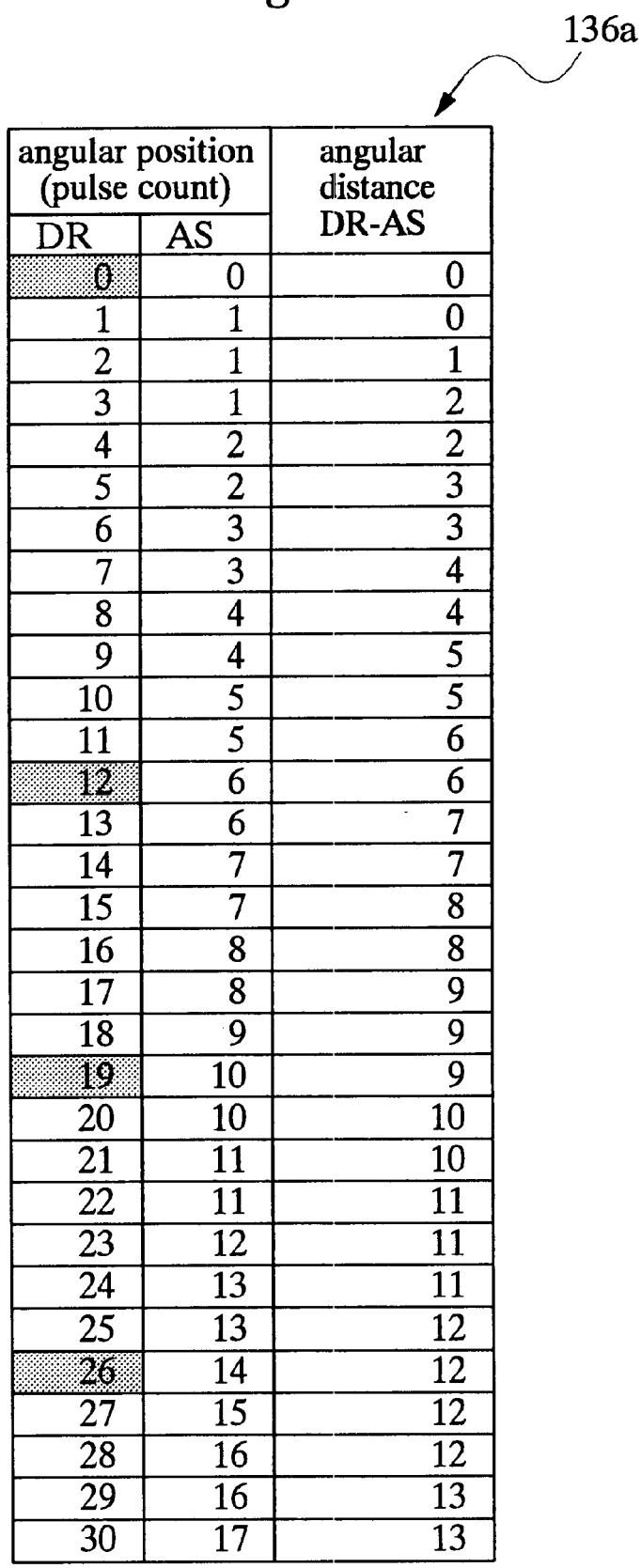
FIG. 11 is a reference table of which entries are data useful for controlling the DR-side wiper blade.
Figure 12:
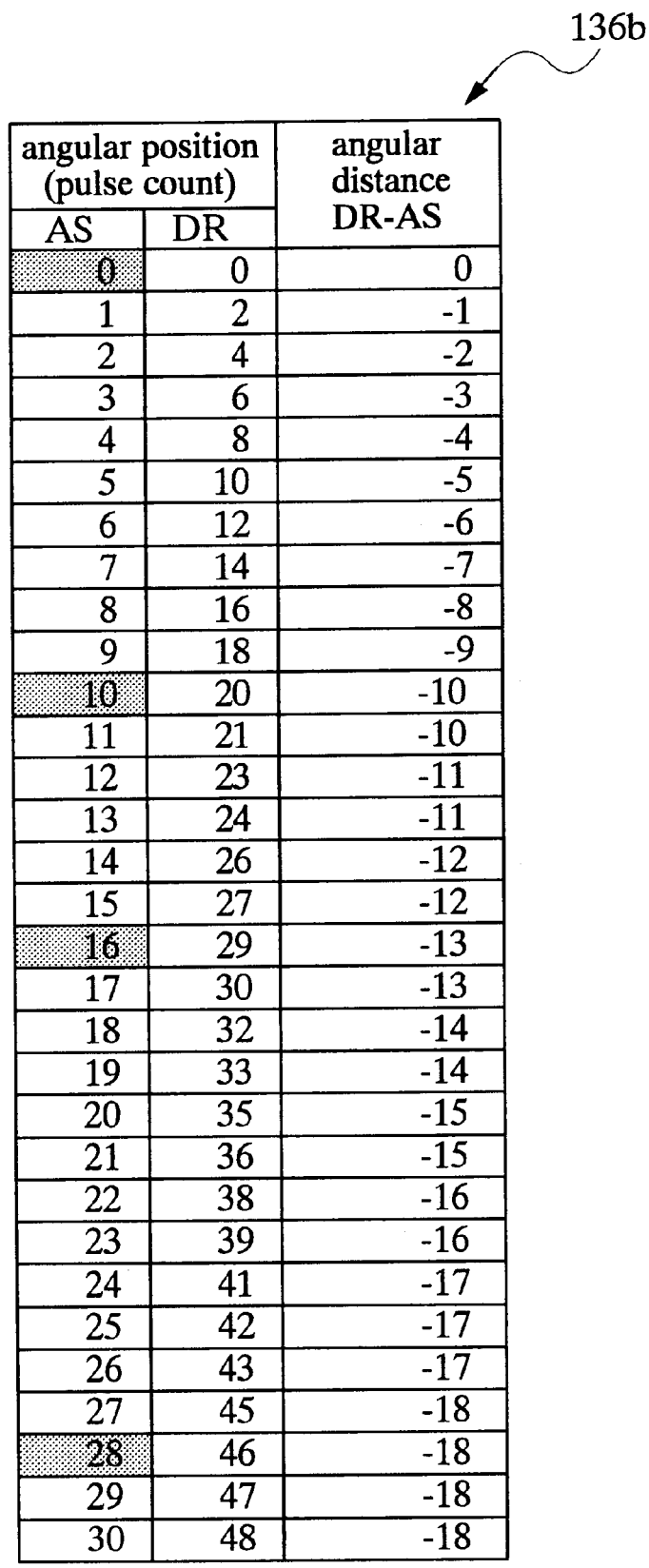
FIG. 12 is a reference table of which entries are data useful for controlling the AS-side wiper blade.

In the rear stages of the measurement angle difference calculation means 33a and 33b, there are respectively provided a DR-side angle difference data calculation means 34a and a AS-side angle difference data calculation means 34a, and target angular distances as comparative objects are read from a DR-side target angular distance reference table 136a and a AS-side target angular distance reference table 136b previously stored in the ROM 24. FIGS. 11 and 12 show the structure of these maps. FIG. 11 shows the target angular distance reference table 136a indicating the target angular distance with respect to the position angle in the DR-side as a reference and FIG. 12 shows the AS-side target angular distance reference table 136b indicating the target angular distance with respect to the position angle in the AS-side as a reference.

In this case, for example, it will be found from the DR-side target angular distance reference table 136a in FIG. 11 that when the angular position in the DR-side is "10" pulses and corresponding target angular distance of the AS-side is "5" pulses, which requests that the target angular distance between both sides is "+5". If data of "DR=10, AS=7" is obtained and actual detected angular distance is found to be "+3", as in the above example, the DR-side angular difference calculation means 34a carries out arithmetic operation of ((+5)−(+3)) to determine that the DR-side angular difference (or first wiper blade angular difference) of "+2". This data represents a state that the wiper blade of the AS-side precedes by "2" pulses amount relative to the target angular distance, as viewed from the DR-side wiper blade (i.e., the blade in the AS-side is excessively coming close to the DR-side).

By contrast, as will be understood from the AS-side target angular distance reference table 136b shown in FIG. 12, when the angular position in the AS-side is "7" pulses in the case of the above example (where DR=10, AS=7), the angular position target in the DR-side is "14" pulses and the target angular distance between both sides is "−7". In this respect, since the detected angular distance is "−3" (7−10) in the above example, the AS-side angular difference calculation means 34b calculates AS-side angular difference (second wiper blade angular difference) of "−4" ((−7)−(−3)) with respect to the target angular distance. This data represents that the wiper blade in the DR-side is delayed by "4" pulses relative to the target angular distance, viewed from the following wiper blade in the AS-side (i.e., the blade in the DR-side is coming close to the other).

Meanwhile, in the rear stages behind the angular difference calculation means 34a and 34b, there are provided a DR-side motor control means 35*a* (as a first motor control means) and a AS-side motor control means (as a second motor control means 35*b* (as a second motor control means) for calculating and determining the outputs of the motors 31 and 3*b* based on the obtained angular difference, respectively. Here, the outputs of the motors 3*a* and 3*b* which reduce the difference between the target angular distance and the detected angular distance are calculated and supplied to the motor drive units 10*a* and 10*b*.

Specifically, according to the example described above, the DR-side motor control means 35*a* obtains a value "+2" as DR-side angular difference and calculates a subsequent output of the DR-side motor 3*a*, based on the value. In this case, it is recognized from the obtained angular difference that the wiper blade in the AS-side is brought close to by "2" pulses than the target value. According to this recognition, a higher output (or rotation velocity) than at present is calculated for the DR-side in order that the angular position distance is widened to approach the target value. Further, to realize this output, a control signal is supplied to the DR-side motor drive unit 10*a*.

In the AS-side motor control means 35*b*, according to the example described above, the means 35*b* obtains a value "−4" as AS-side angular difference and calculates a subsequent output of the AS-side motor 3*b*, based on the value. In this case, it is recognized from the obtained angular difference that the wiper blade in the DR-side is brought close to by "4" pulses than the target value. According to this recognition, a lower output (or rotation velocity) than at present is calculated for the AS-side in order that the angular position distance is widened to approach the target value. Further, to realize this output, a control signal is supplied to the AS-side motor drive unit 10*b*.

Thus, in the wiper control apparatus according to the present invention, each of the motors 3*a* and 3*b* is independently controlled such that the detected angular distance between the wiper blades 2*a* and 2*b* approaches the target angular distance. That is, when the angular position distance between both wiper blades 2*a* and 2*b* becomes smaller than the target value (or they have come close to each other), the output in the leading side is increased while the output in the follower side is decreased to reduce the difference from the target angular distance. In addition, when the angular position difference becomes larger than the target (or the blades have come to be apart from each other), the output in the leading side is decreased while the output in the follower side is increased to reduce the difference from the target angular distance. Therefore, if a change occurs in the angular position distance between the wiper blades 2*a* and 2*b*, the outputs of both motors 3*a* and 3*b* can be changed successively in correspondence with the change, and therefore, the outputs of both motors 3*a* and 3*b* can be rapidly converged to the target angular distance indicated in the target angular distance reference tables. Accordingly, it is possible to reduce the variation of the angular position distance between the wiper blades 2*a* and 2*b*.

Meanwhile, in the present wiper drive apparatus 112, one of the wiper blades 2*a* and 2*b* is paused to normalize the position angle differences during control based on the position angles as described above in some cases. In this situation, if the motors 3*a* and 3*b* are rotated reversely by an external force as described before, the position angles are corrected accordingly. Prior to the correction of data, however, a reverse rotation prevention measure is taken by the motors 3*a* and 3*b*. That is, upon recognition of reverse rotation of the motors 3*a* and 3*b*, the outputs of the motors are increased and control is made for maintaining the current positions as securely as possible.

In this case, the motor output calculation means 35*a* and 35*b* constantly obtain data concerning the rotation directions of the motors 3*a* and 3*b* from the motor rotation direction detector means 137*a* and 137*b*. Upon obtaining data indicating that the motors 3*a* and 3*b* are rotating reversely, the motor output calculation means 35*a* and 35*b* increase the motor outputs to resist the reverse rotation force so that the reverse rotation is prevented even if the wiper blades 2*a* and 2*b* are paused. In this state, if rotation in the regular rotation direction is observed, the motor outputs are decreased to loosen the motions of the wiper blades and the situation is checked. If reverse rotation is involved again, the motor outputs are increased again.

Figure 13:
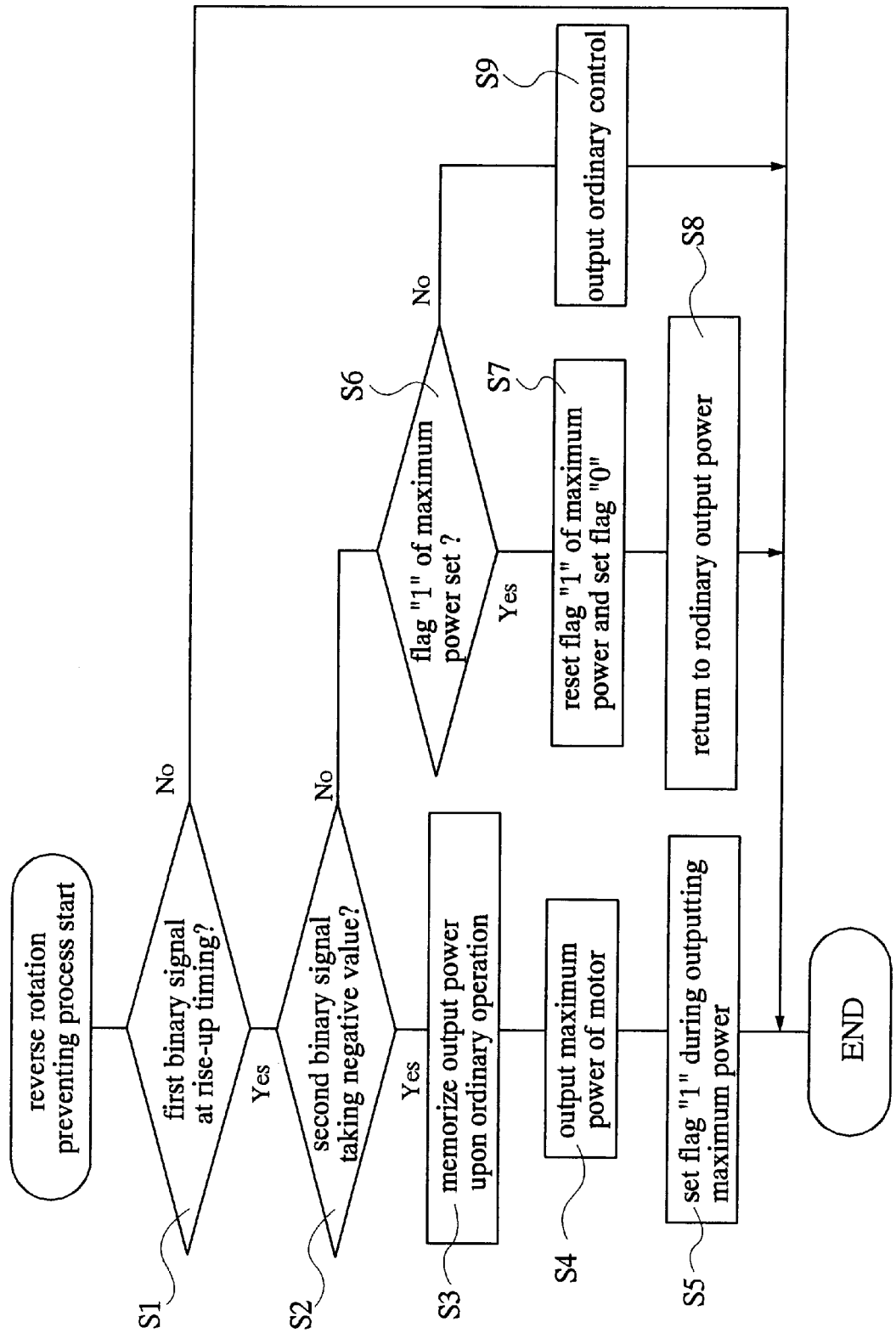
FIG. 13 is a flowchart showing a process for preventing the reverse rotation of the drive shaft.

FIG. 13 is a flowchart showing the procedure of reverse rotation prevention processing. In FIG. 13, the rise of a rotation is determined firstly in a step S1, and whether a direction pulse (second periodic signal) is minus or not is determined in a step S2. If a rotation pulse (first periodic signal) rises and if the direction pulse is minus, the motor is determined as rotating reversely (see FIG. 10(*b*)). Further, the motor output during normal operation is stored in a step S3, and the motor output is maximized to prevent reverse rotation in a step S4. Thereafter, a flag indicating that the motor has performed the maximum output is let stand in a step S5 and one routine of processing is then terminated.

In the step S1 in the next routine, the rotation pulse rises. If the direction pulse is plus in the step S2, the motor is determined as rotating regularly (see FIG. 10(*a*)). Further, in a step S6, the maximum output flag is checked. If the flag has been let stand, resetting is carried out and the motor output is returned to a normal motor output in a step S8. Otherwise, if the maximum output flag has not been let stand in the steps S6 (i.e., if the motor did not rotated reversely in the preceding routine), normal control is continued.

Thus, the wiper drive device 112 performs output control of the motors by detecting the rotation directions of the motors 3*a* and 3*b* by the direction pulses and rotation pulses. Reverse rotation of the motors 3*a* and 3*b* due to an external force can be prevented by repeatedly carrying out the procedure described above. Therefore, even if the wiper blades 2*a* and 2*b* are paused and the motor drive circuits are opened, the motors are prevented from being rotated reversely and the wiper arms are also prevented from being moved as influenced by the external force. If reverse rotation should then occur, of course, correction of position angles is carried out.

While in the above example, the Hall elements arranged at positions shifted by 90° from each other are used to obtain the rotation pulse and the, direction pulse. However, any detector means can be used as long as pulse signals having phases shifted from each other can be obtained. The kind of detector means to be provided and the angle at which the detector means is to be arranged are not limited to those indicated in the example described above.

Thus, according to the above embodiment of the present invention, the rotation direction of each of the motors is determined with use of two pulses having phases shifted by 90° from each other, i.e., with use of the rotation pulse and the direction pulse so that wiper drive control is performed. Therefore, if any of the motors is rotated in the reverse direction, the motor outputs can be increased to resist the reverse rotation force. Accordingly, if an external force acts on the wiper blades or arms during a pause of the wiper apparatus, the motors are prevented from being rotated in the reverse direction and the wiper arms are prevented from being moved due to the external force.

Also, according to the present invention, if a wiper drive motor is rotated reversely, reverse rotation of the motor is detected and data concerning position angles of the wiper blades can be corrected. Therefore, the position angle data is prevented from being displaced wrongly due to reverse rotation of the motor and abnormal motions of the wiper blades can thus be prevented.

Detailed description has hereinabove been given of the invention achieved by the present inventor with reference to the embodiment. However, the present invention should not be limited to the embodiment described above, and various modification can be effected without departing from the gist of the invention, and all such variations shall be embraced within the scope of the invention.

What is claimed is:

1. A method of controlling a wiper apparatus having left and right wiper blades respectively driven by separate motors, said method comprising: driving each of said motors in predetermined directions of rotation, providing a means for detecting the direction of rotation of each motor, and providing a control unit responsive to said rotation direction detection means for increasing the energization of a motor when that motor has been detected by the detection means to have rotated in a direction opposite to the predetermined direction so as to resist the force causing the opposite direction rotation of the motor.

2. A method according to claim 1, wherein rotation directions of the motors are detected by the detecting means by way of a plurality of pulses which have phases different from each other and which are generated in synchronism with rotations of the motors.

3. A method of controlling a wiper apparatus having left and right wiper blades respectively driven by separate motors, wherein
 a rotation pulse train for detecting rotation angles of the motors and a direction pulse train having a phase different from the rotation pulse train are respectively generated for each motor in synchronism with the rotations of the motors, and
 motor rotation angles calculated through the use of the rotation pulse train are corrected on the basis of motor rotation directions detected through the use of the direction pulse train.

4. A method for controlling a wiper apparatus having a wiper blade connected through a drive shaft to a drive motor for driving the wiper blade, comprising the steps of:
 generating a first periodic signal associated with the rotation of the drive shaft and starting at a first phase of rotation;
 generating a second periodic signal associated with the rotation of the drive shaft and starting at a second phase different from the first phase of rotation;
 determining the direction of the rotation of the drive shaft based on the relationship between the first phase of the first periodic signal and the second phase of the second periodic signal; and
 controlling the motor based on the determined direction of the rotation.

5. A method according to claim 4, wherein each of the first and second periodic signals is a binary signal, one period of each of the signals is associated with one fixed amount of angular rotation of the drive shaft, and the difference between the first phase and second phase is arranged to be a quarter period of the periodic signals.

6. A method for controlling a wiper apparatus having a couple of wiper blades each connected through a drive shaft to a drive motor driving the wiper blade, the wiper blades being controlled such that the motion of one of the wiper blades relative to the other is maintained in a predetermined state based on a count of pulses which are arranged to be generated in association with the angular distance traveled by each the wiper blades, the method comprising the steps of:
 generating a first periodic signal associated with the rotation of each of the drive shafts and starting at a first phase of rotation;
 generating a second periodic signal associated with the rotation of each of the drive shafts and starting at a second phase different from the first phase of rotation;
 determining the direction of the rotation of each of the drive shafts based on the relationship between the first phase of the first periodic signal and the second phase of the second periodic signal;
 subtracting the pulse count counted during the rotation in one direction from the pulse count counted during the rotation in the other direction, thereby to determine actual angular position of each of the wiper blades; and
 controlling the wiper blades so as to maintain the positional relationship between the wiper blades in the predetermined state based on the determined actual angular position of each of the wiper blades.

7. A method according to claim 6, wherein each of the first and second periodic signals is a binary signal and one period of each of the signals is associated with one rotation of the drive shaft, and the difference between the first phase and second phase is arranged to be a quarter period of the periodic signals.

8. A method according to claim 7, wherein one of the periodic signals also serves as a train of pulses counted for determining the angular distance traveled by each of the wiper blades.

9. A method for controlling a wiper apparatus having a wiper blade connected through a drive shaft to a drive motor for driving the wiper blade, comprising the steps of:
 generating a first periodic signal associated with the rotation of the drive shaft and starting at a first phase of rotation;
 generating a second periodic signal associated with the rotation of the drive shaft and starting at a second phase different from the first phase of rotation;
 detecting a predetermined direction of the rotation of the drive shaft based on the relationship between the first phase of the first periodic signal and the second phase of the second periodic signal; and
 controlling the motor to rotate in the other direction opposite to the predetermined direction in response to the detection of the rotation of the drive shaft in the predetermined direction.

10. A wiper apparatus having a wiper blade connected through a drive shaft to a drive motor for driving the wiper blade, comprising:
 first signal generating means for generating a first periodic signal associated with the rotation of the drive shaft and starting at a first phase of rotation;
 second signal generating means for generating a second periodic signal associated with the rotation of the drive shaft and starting at a second phase different from the first phase of rotation;
 determining means for determining the direction of the rotation of the drive shaft based on the relationship between the first phase of the first periodic signal and the second phase of the second periodic signal; and
 control means for controlling the motor based on the determined direction of the rotation.

11. A wiper apparatus according to claim 10, wherein each of the first and second periodic signals is a binary signal, one period of each of the signals is associated with one fixed amount of angular rotation of the drive shaft, and the difference between the first phase and second phase is arranged to be a quarter period of the periodic signals.

12. A wiper apparatus having a couple of wiper blades each connected through a drive shaft to a drive motor driving the wiper blade, the wiper blades being controlled such that the motion of one of the wiper blades relative to the other is maintained in a predetermined state based on a count of pulses which are arranged to be generated in association with the angular distance traveled by each the wiper blades, the wiper apparatus comprising:

first generating means for generating a first periodic signal associated with the rotation of each of the drive shafts and starting at a first phase of rotation;

second generating means for generating a second periodic signal associated with the rotation of each of the drive shafts and starting at a second phase different from the first phase of rotation;

determining means for determining the direction of the rotation of each of the drive shafts based on the relationship between the first phase of the first periodic signal and the second phase of the second periodic signal;

calculation means for subtracting the pulse count counted during the rotation in one direction from the pulse count counted during the rotation in the other direction, thereby to determine actual angular position of each of the wiper blades; and controlling means for controlling the wiper blades so as to maintain the positional relationship between the wiper blades in the predetermined state based on the determined actual angular position of each of the wiper blades.

13. A wiper apparatus according to claim 12, wherein each of the first and second periodic signals is a binary signal and one period of each of the signals is associated with one rotation of the drive shaft, and the difference between the first phase and second phase is arranged to be a quarter period of the periodic signals.

14. A wiper apparatus according to claim 13, wherein one of the periodic signals also serves as a train of pulses counted for determining the angular distance traveled by each of the wiper blades.

15. A wiper apparatus having a wiper blade connected through a drive shaft to a drive motor for driving the wiper blade, comprising:

first signal generating means for generating a first periodic signal associated with the rotation of the drive shaft and starting at a first phase of rotation;

second signal generating means for generating a second periodic signal associated with the rotation of the drive shaft and starting at a second phase different from the first phase of rotation;

detecting means for detecting a predetermined direction of the rotation of the drive shaft based on the relationship between the first phase of the first periodic signal and the second phase of the second periodic signal; and control means for controlling the motor to rotate in the other direction opposite to the predetermined direction in response to the detection of the rotation of the drive shaft in the predetermined direction.

16. A wiper apparatus according to claim 10, wherein the signal generating means is comprised of a magnet attached to the drive shaft and a sensor device capable of sensing a magnetic field exerted by the magnet attached to the drive shaft.

17. A wiper apparatus according to claim 12, wherein the signal generating means is comprised of a magnet attached to the drive shaft and a sensor device capable of sensing a magnetic field exerted by the magnet attached to the drive shaft.

18. A wiper apparatus according to claim 15, wherein the signal generating means is comprised of a magnet attached to the drive shaft and a sensor device capable of sensing a magnetic field exerted by the magnet attached to the drive shaft.

19. A wiper apparatus having wiper blades respectively attached to wiper arms driven by separate motors through separate drive systems converting rotation of the motors to wiping rotation of the wiper arms, comprising:

a one-way clutch mechanism for reverse rotation prevention for the motor arranged in each drive system between the motor and the wiper arm, the one-way mechanism transmitting rotation in a predetermined direction from the motor to the wiper blade and not transmitting rotation to the motor in the direction opposite to the predetermined direction from the wiper blade.

20. A wiper apparatus according to claim 19, wherein the one-way clutch is provided at an output shaft of the motor.

21. A wiper apparatus according to claim 19, wherein the one-way clutch is provided at an armature shaft of the motor.

* * * * *